United States Patent
Hsueh et al.

(10) Patent No.: US 10,359,607 B2
(45) Date of Patent: Jul. 23, 2019

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Chun-Che Hsueh, Taichung (TW); Chien-Hsun Wu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/698,789

(22) Filed: Sep. 8, 2017

(65) Prior Publication Data

US 2018/0299648 A1    Oct. 18, 2018

(30) Foreign Application Priority Data

Apr. 12, 2017 (TW) .............................. 106112227 A

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
USPC ................................................ 359/642, 708
See application file for complete search history.

(56) References Cited

U.S. PATENT DOCUMENTS

| 8,792,185 | B2 | 7/2014 | Hsu et al. |
| 9,864,172 | B1 | 1/2018 | Tsai et al. |
| 2014/0085735 | A1 | 3/2014 | Shih |
| 2015/0085135 | A1 | 3/2015 | Chen et al. |
| 2015/0219879 | A1 | 8/2015 | Zhao et al. |
| 2016/0231532 | A1 | 8/2016 | Huang et al. |
| 2017/0205604 | A1 | 7/2017 | Hsu et al. |
| 2018/0045921 | A1 | 2/2018 | Kumazawa et al. |
| 2018/0188491 | A1 | 7/2018 | Chang et al. |
| 2018/0314038 | A1* | 11/2018 | Hsieh ................. G02B 13/0045 |

FOREIGN PATENT DOCUMENTS

| CN | 105807398 A | 7/2016 |
| JP | 05173069 A | 7/1993 |
| JP | 2000066095 A | 3/2000 |
| WO | 2013137312 A1 | 9/2013 |
| WO | 2018/148301 A1 | 8/2018 |

* cited by examiner

*Primary Examiner* — Tuyen Tra

(74) *Attorney, Agent, or Firm* — McClure, Qualey & Rodack, LLP

(57) ABSTRACT

An image capturing lens assembly includes five lens elements, which are, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element has positive refractive power. The fifth lens element with negative refractive power has an image-side surface being concave in a paraxial region thereof and includes at least one convex critical point in an off-axis region thereof.

21 Claims, 25 Drawing Sheets

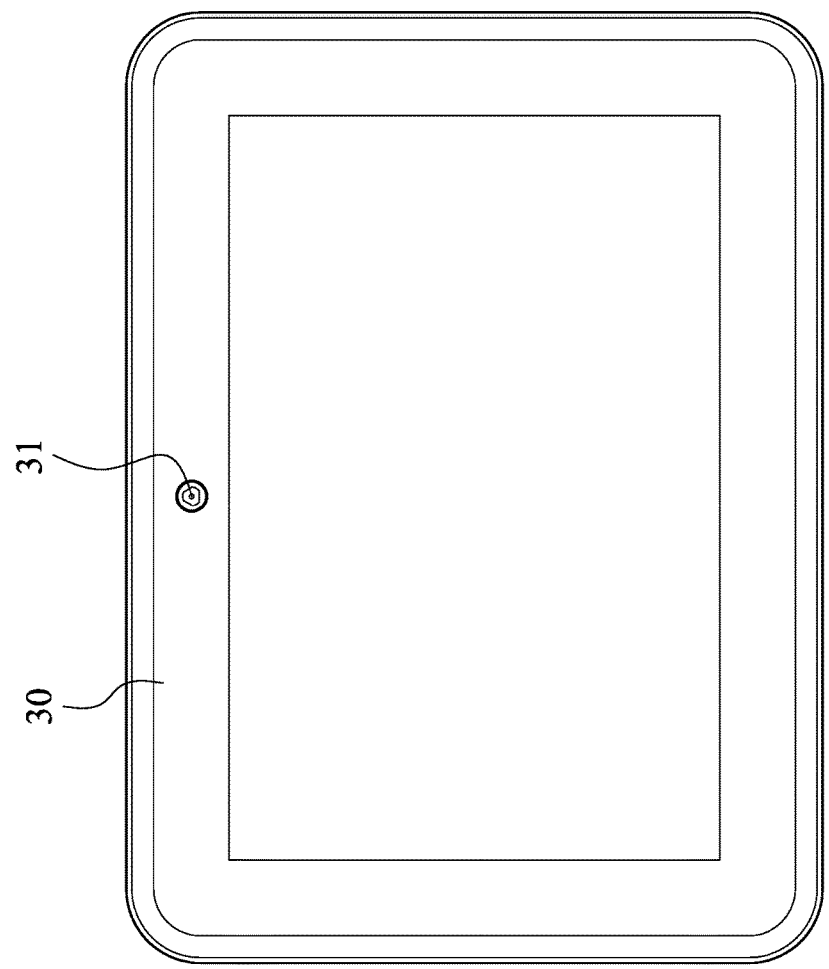

and the fourth lens element is T34, an axial distance between the fourth lens element and the fifth lens element is T45, a curvature radius of the object-side surface of the fifth lens element is R9, and a curvature radius of the image-side surface of the fifth lens element is R10, the following conditions are satisfied:

$$1.0<T45/(T23+T34)<6.0;$$

$$0<T12/T45<1.80; \text{ and}$$

$$0<(R9+R10)/(R9-R10).$$

According to another aspect of the present disclosure, an imaging apparatus includes the image capturing lens assembly of the aforementioned aspect and an image sensor, wherein the image sensor is disposed on an image surface of the image capturing lens assembly.

According to another aspect of the present disclosure, an electronic device includes the imaging apparatus of the aforementioned aspect.

According to one aspect of the present disclosure, an image capturing lens assembly includes five lens elements, the five lens elements being, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element has positive refractive power. The fifth lens element with negative refractive power has an image-side surface being concave in a paraxial region thereof and including at least one convex critical point in an off-axis region thereof, wherein both of an object-side surface and the image-side surface of the fifth lens element are aspheric. When an axial distance between the second lens element and the third lens element is T23, an axial distance between the third lens element and the fourth lens element is T34, an axial distance between the fourth lens element and the fifth lens element is T45, a curvature radius of the object-side surface of the fifth lens element is R9, and a curvature radius of the image-side surface of the fifth lens element is R10, the following conditions are satisfied:

$$1.66<T45/(T23+T34)<5.0; \text{ and}$$

$$-0.60<(R9+R10)/(R9-R10).$$

IMAGE CAPTURING LENS ASSEMBLY, IMAGING APPARATUS AND ELECTRONIC DEVICE

RELATED APPLICATIONS

This application claims priority to Taiwan Application Serial Number 106112227, filed Apr. 12, 2017, which is herein incorporated by reference.

BACKGROUND

Technical Field

The present disclosure relates to an image capturing lens assembly and an imaging apparatus. More particularly, the present disclosure relates to an image capturing lens assembly and an imaging apparatus with wide field of view applicable to electronic devices.

Description of Related Art

With the wider application of photographing modules, installing photographing modules in various smart electronic devices, portables, mobile devices, recognition devices, entertainment systems, sporting devices and smart home assisting systems is becoming a major trend in developments for the future technology, especially portables which are in high public demands. In order to obtain more extensive experiences in utilizations, smart devices with one, two or more than three lens assemblies are becoming the market mainstream, and various photographing modules with different features are developed in response to different demands.

Further, with recent demands of compact electronic devices, conventional photographing modules are unable to satisfy both requirements of high-end specification and compactness at the same time, especially features pertaining a large aperture or micro lens assembly with wider field of view. In detail, in the conventional lens assemblies, the total track length of the lens assembly would often increase when the wide field of view is arranged, so that the demands for compactness cannot be obtained. Thus, there is a need for a lens assembly which has wide field of view and compactness for satisfying market specifications and demands.

SUMMARY

According to one aspect of the present disclosure, an image capturing lens assembly includes five lens elements, the five lens elements being, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element has positive refractive power. The fifth lens element with negative refractive power has an image-side surface being concave in a paraxial region thereof and including at least one convex critical point in an off-axis region thereof, wherein both of an object-side surface and the image-side surface of the fifth lens element are aspheric. When an axial distance between the first lens element and the second lens element is T12, an axial distance between the second lens element and the third lens element is T23, an axial distance between the third lens

BRIEF DESCRIPTION OF THE DRAWINGS

FIG. 22 is a schematic view of an electronic device according to the 12th embodiment of the present disclosure.

DETAILED DESCRIPTION

Figure 1:
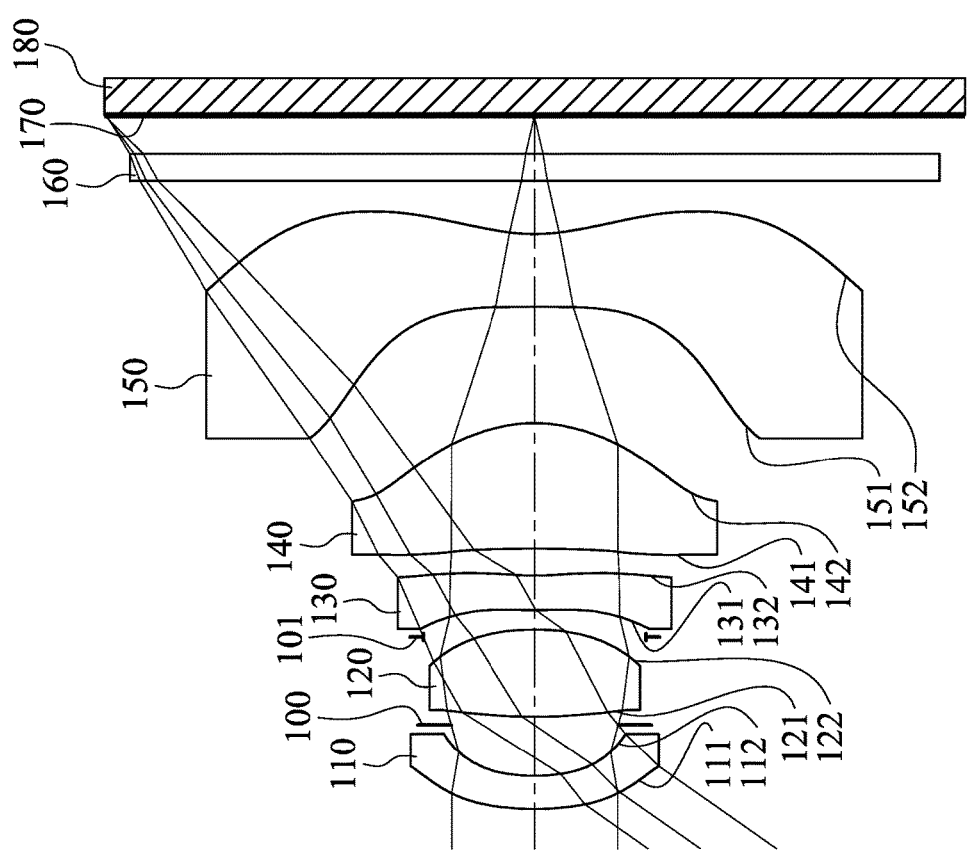
FIG. 1 is a schematic view of an imaging apparatus according to the 1st embodiment of the present disclosure.

An image capturing lens assembly includes five lens elements, the five lens elements being, in order from an object side to an image side, a first lens element, a second lens element, a third lens element, a fourth lens element and a fifth lens element.

The first lens element with negative refractive power has an image-side surface being concave in a paraxial region thereof. Therefore, it is favorable for light from large angle of view converging in the image capturing lens assembly. The first lens element can have an object-side surface being convex in a paraxial region thereof, so that the total track length of the image capturing lens assembly can be reduced effectively so as to maintain the compact size. Alternatively, the first lens element can have the object-side surface being concave in a paraxial region thereof and including at least one convex critical point in an off-axis region thereof, so that the shape variation of the entire surface of the first lens element can be moderated so as to be suitable for production, and the manufacturing yield rate can be increased.

The second lens element with positive refractive power can have an image-side surface being convex in a paraxial region thereof. Therefore, it is favorable for reducing the total track length of the image capturing lens assembly and enhancing the ability of astigmatic correction by having sufficient refractive power.

The third lens element with negative refractive power has an image-side surface being concave in a paraxial region thereof. Therefore, aberrations of the image capturing lens assembly can be corrected. Furthermore, at least one of an object-side surface and the image-side surface of the third lens element can include at least one critical point in an off-axis region thereof, so that it is favorable for light from large angle of view converging in the image capturing lens assembly, and aberrations in the off-axis region can be also corrected.

The fourth lens element has positive refractive power so as to enhance the image quality by balancing the arrangement of the positive refractive power of the image capturing lens assembly. The fourth lens element can have an object-side surface being convex in a paraxial region thereof so as to reduce the total track length thereof. Alternatively, the fourth lens element can have the object-side surface being concave in a paraxial region thereof and an image-side surface being convex in a paraxial region thereof so as to correct aberrations thereof.

The fifth lens element with negative refractive power can have an object-side surface being convex in a paraxial region thereof, and has an image-side surface being concave in a paraxial region thereof and including at least one convex critical point in an off-axis region thereof. Therefore, the principal point of the image capturing lens assembly can be positioned closer to the object side so as to reduce the back focal length and further control the total track length thereof. Moreover, the arrangement of the convex critical point can correct aberrations in the off-axis region thereof so as to enhance the image quality in an off-axis region thereof.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied: $1.0<T45/(T23+T34)<6.0$; and $0<T12/T45<1.80$. Therefore, it is favorable for reducing the back focal length and minimizing the total track length and size of the image capturing lens assembly by increasing the distance between the fourth lens element and the fifth lens element so as to be more applicable to the electronic devices. Furthermore, by lengthening the distance between the lens elements, it is favorable for reducing the environmental effects associated with temperature and enabling applications in extreme conditions for the electronic devices, such as mobile devices, aerial vehicles, etc. Preferably, the following condition can be satisfied: $1.25<T45/(T23+T34)<5.0$. More preferably, the following condition can be satisfied: $1.66<T45/(T23+T34)<5.0$. Moreover, the following condition can also be satisfied: $0.3<T12/T45<1.5$.

When a curvature radius of the object-side surface of the fifth lens element is R9, and a curvature radius of the image-side surface of the fifth lens element is R10, the following condition is satisfied: $-0.60<(R9+R10)/(R9-R10)$. Therefore, the thickness variation of the fifth lens element from the paraxial region thereof to the off-axis region thereof can be moderated, so that the unfavorable fabrication due to the excessive difference of the thicknesses in the off-axis region thereof can be avoided, or the off-axis image would not be such sensitive to the manufacturing tolerance of the fifth lens element. Preferably, the following condition can be satisfied: $0<(R9+R10)/(R9-R10)$.

When an Abbe number of the third lens element is V3, and an Abbe number of the fifth lens element is V5, the following condition is satisfied: $|V3|+|V5|<65$. Therefore, it is favorable for enhancing the image quality by strengthening the chromatic aberration correcting ability of the image capturing lens assembly, especially the quality of the off-axis image, and the tolerance of environment factors can be increased.

When an axial distance between the image-side surface of the fifth lens element and an image surface is BL, and the axial distance between the fourth lens element and the fifth lens element is T45, the following condition is satisfied: $0.75<BL/T45<1.80$. Therefore, it is favorable for reducing the back focal length of the image capturing lens assembly and minimizing the size thereof.

When a focal length of the image capturing lens assembly is f, a focal length of the fourth lens element is f4, and a focal length of the fifth lens element is f5, the following condition is satisfied: $1.35<|f/f4|+|f/f5|$. Therefore, it is favorable for enhancing the aberrations correction ability of the lens elements on the image side of the image capturing lens assembly. Preferably, the following condition can be satisfied: $1.35<|f/f4|+|f/f5|<3.0$.

When half of a maximum field of view of the image capturing lens assembly is HFOV, the following condition is satisfied: $1.0<\tan(HFOV)$. Therefore, it is favorable for enhancing the characteristic of a large angle for the image capturing lens assembly.

When an f-number of the image capturing lens assembly is Fno, the following condition is satisfied: $1.20<Fno<2.30$. Therefore, it is favorable for increasing the light absorption of the image capturing lens assembly so as to capture a clearer image.

Each of the aforementioned features of the image capturing lens assembly can be utilized in various combinations for achieving the corresponding effects.

According to the image capturing lens assembly of the present disclosure, the lens elements thereof can be made of glass or plastic materials. When the lens elements are made of glass materials, the distribution of the refractive power of the image capturing lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing lens assembly. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof.

According to the image capturing lens assembly of the present disclosure, the refractive power or the focal length of a lens element being positive or negative may refer to the refractive power or the focal length in a paraxial region of the lens element.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, the image surface of the image capturing lens assembly, based on the corresponding image sensor, can be flat or curved. In particular, the image surface can be a concave curved surface facing towards the object side. According to the image capturing lens assembly of the present disclosure, at least one image correcting element (such as a field flattener) can be selectively disposed between the lens element closest to the image side of the optical image capturing assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin piano-concave element having a concave surface toward the object side and is disposed close to the image surface.

According to the image capturing lens assembly of the present disclosure, an aperture stop can be configured as a front stop or a middle stop. A front stop disposed between an object and the first lens element can provide a longer distance between an exit pupil of the image capturing lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing lens assembly and thereby provides a wider field of view for the same.

According to the image capturing lens assembly of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point.

According to the image capturing lens assembly of the present disclosure, the image capturing lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned image capturing lens assembly and an image sensor, wherein the image sensor is disposed on the image side of the aforementioned image capturing lens assembly, that is, the image sensor can be disposed on or near the image surface of the aforementioned image capturing lens assembly. By arranging the first lens element with negative refractive power, the wide field of view can be provided, and the total track length and size thereof can be reduced by properly arranging the distance between the lens elements, so that the image capturing lens assembly and the imaging apparatus can be more applicable to the electronic device. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-13th specific embodiments are provided for further explanation.

1st Embodiment

Figure 2:
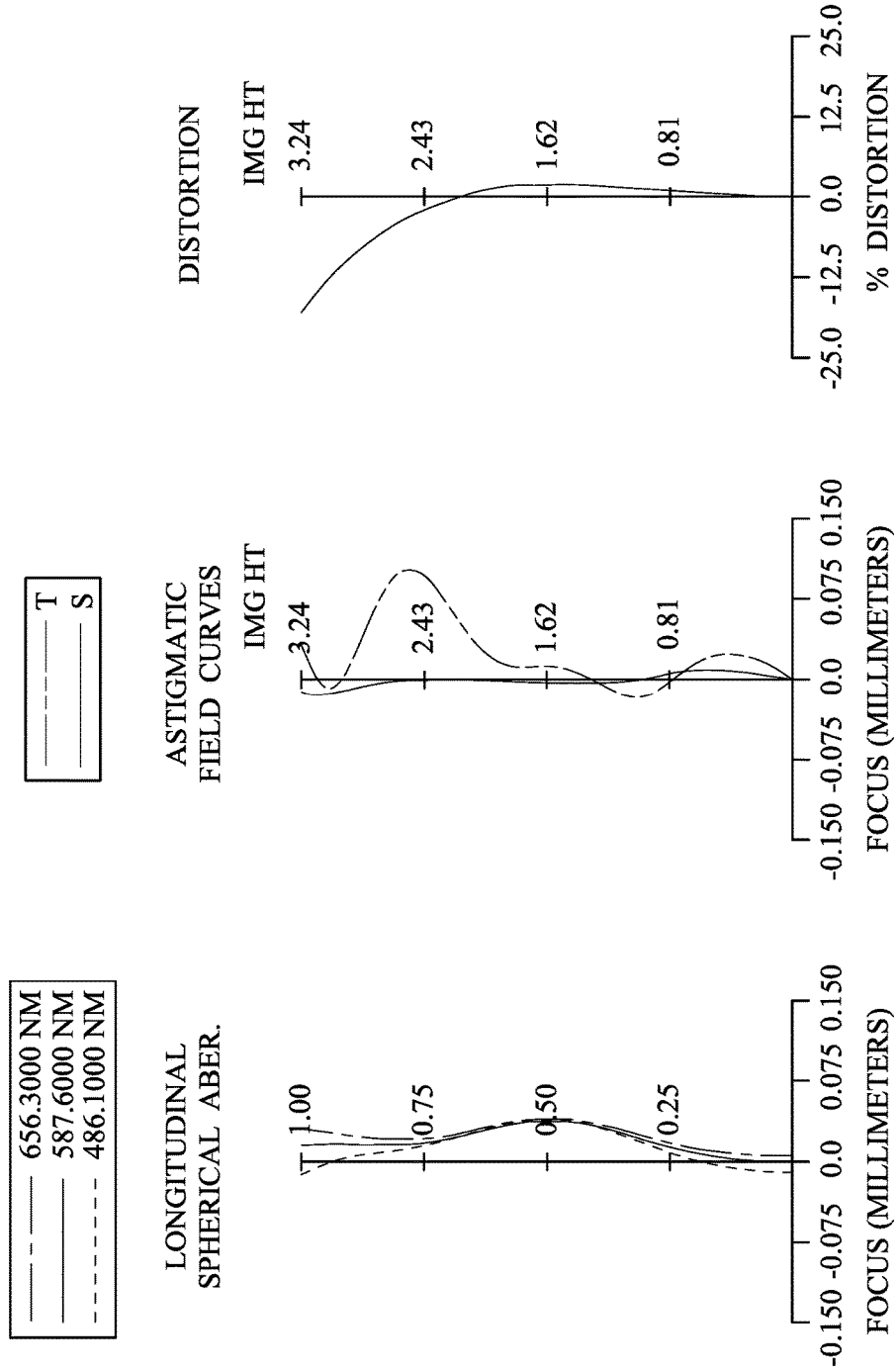
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing lens assembly (its reference numeral is omitted) and an image sensor 180. The image capturing lens assembly includes, in order from an object side to an image side, a first lens element 110, an aperture stop 100, a second lens element 120, a stop 101, a third lens element 130, a fourth lens element 140, a fifth lens element 150, an IR-cut filter 160 and an image surface 170, wherein the image sensor 180 is disposed on the image surface 170 of the imaging lens assembly. The imaging lens assembly includes five lens elements (110, 120, 130, 140 and 150) without additional one or more lens elements inserted between the first lens element 110 and the fifth lens element 150.

The first lens element 110 with negative refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of a plastic material, and has the object-side surface 121 and the image-side surface 122 being both aspheric.

Figure 19:
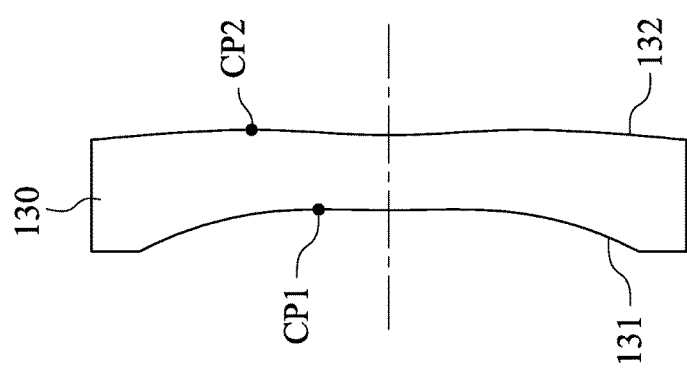
FIG. 19 shows a schematic view of a critical point of the object-side surface of the third lens element and a critical point of the image-side surface of the third lens element according to the 1st embodiment of FIG. 1.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, FIG. 19 shows a schematic view of a critical point CP1 of the object-side surface 131 of the third lens element 130 and a critical point CP2 of the image-side surface 132 of the third lens element 130 according to the 1st embodiment of FIG. 1. In FIG. 19, the object-side surface 131 of the third lens element 130 includes at least one concave critical point CP1 in an off-axis region thereof, and the image-side surface 132 of the third lens element 130 includes at least one convex critical point CP2 in an off-axis region thereof.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least one convex critical point in an off-axis region thereof.

The IR-cut filter 160 is made of a glass material and located between the fifth lens element 150 and the image surface 170, and will not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of a maximum field of view of the image capturing lens assembly is HFOV, these parameters have the following values: f=2.76 mm; Fno=2.20; and HFOV=54.9 degrees.

In the image capturing lens assembly according to the 1st embodiment, when half of a maximum field of view of the image capturing lens assembly is HFOV, the following condition is satisfied: tan(HFOV)=1.42.

In the image capturing lens assembly according to the 1st embodiment, when an Abbe number of the third lens element 130 is V3, and an Abbe number of the fifth lens element 150 is V5, the following condition is satisfied: |V3|+|V5|=47.7.

In the image capturing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following conditions are satisfied: T12/T45=0.51; and T45/(T23+T34)=2.50.

In the image capturing lens assembly according to the 1st embodiment, when an axial distance between the image-side surface 152 of the fifth lens element 150 and the image surface 170 is BL, and the axial distance between the fourth lens element 140 and the fifth lens element 150 is T45, the following condition is satisfied: BL/T45=1.03.

In the image capturing lens assembly according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=0.97.

In the image capturing lens assembly according to the 1st embodiment, when the focal length of the image capturing lens assembly is f, a focal length of the fourth lens element 140 is f4, and a focal length of the fifth lens element 150 is f5, the following condition is satisfied: |f/f4|+|f/f5|=2.27.

The detailed optical data of the 1st embodiment are shown in Table 1 and the aspheric surface data are shown in Table 2 below.

the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
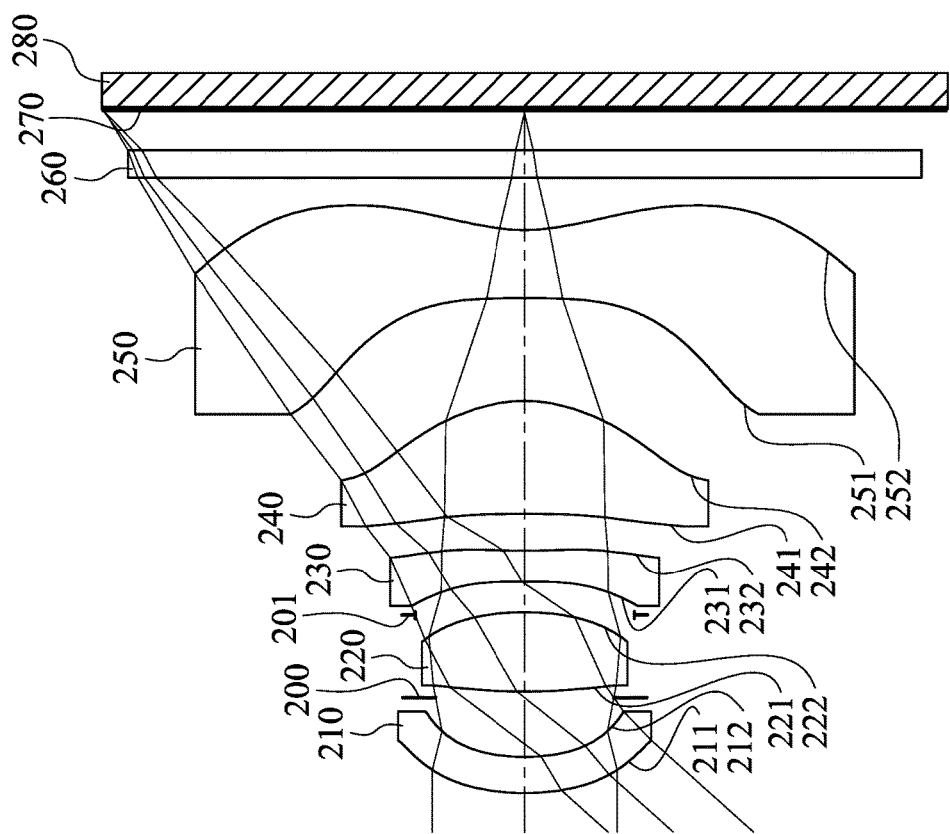
FIG. 3 is a schematic view of an imaging apparatus according to the 2nd embodiment of the present disclosure.

FIG. 3 is a schematic view of an imaging apparatus according to the 2nd embodiment of the present disclosure.

TABLE 1

1st Embodiment
f = 2.76 mm, Fno = 2.20, HFOV = 54.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.516 | ASP | 0.250 | Plastic | 1.545 | 56.1 | −6.81 |
| 2 | | 1.447 | ASP | 0.386 | | | | |
| 3 | Ape. Stop | Plano | | 0.064 | | | | |
| 4 | Lens 2 | 4.761 | ASP | 0.657 | Plastic | 1.534 | 55.9 | 2.79 |
| 5 | | −2.062 | ASP | −0.057 | | | | |
| 6 | Stop | Plano | | 0.204 | | | | |
| 7 | Lens 3 | 4.836 | ASP | 0.260 | Plastic | 1.669 | 19.5 | −7.67 |
| 8 | | 2.435 | ASP | 0.203 | | | | |
| 9 | Lens 4 | −13.329 | ASP | 0.950 | Plastic | 1.544 | 56.0 | 2.35 |
| 10 | | −1.197 | ASP | 0.876 | | | | |
| 11 | Lens 5 | −100.000 | ASP | 0.549 | Plastic | 1.584 | 28.2 | −2.53 |
| 12 | | 1.506 | ASP | 0.400 | | | | |
| 13 | IR-cut filter | Plano | | 0.210 | Glass | 1.517 | 64.2 | — |
| 14 | | Plano | | 0.291 | | | | |
| 15 | Image | Plano | | — | | | | |

Reference wavelength is 587.6 nm (d-line).
Effective radius of Surface 6 is 0.840 mm.

TABLE 2

Aspheric Coefficients

| | Surface # | | | | |
|---|---|---|---|---|---|
| | 1 | 2 | 4 | 5 | 7 |
| k = | −1.8325E+01 | −1.1128E+00 | 8.7399E+00 | 3.9343E+00 | −9.0000E+01 |
| A4 = | 4.0763E−01 | 4.1326E−01 | −1.3183E−02 | −5.1371E−01 | −1.0060E+00 |
| A6 = | −9.9891E−02 | 2.4617E+00 | 2.7592E−01 | 1.3778E+00 | 2.1492E+00 |
| A8 = | −4.9595E−01 | −1.9664E+01 | −1.6994E+00 | −2.1422E+00 | −3.9098E+00 |
| A10 = | 1.4911E+00 | 9.2746E+01 | 5.8527E+00 | 1.0506E−01 | 7.7750E+00 |
| A12 = | −1.7249E+00 | −2.4153E+02 | −1.3787E+01 | 5.5258E+00 | −1.3048E+01 |
| A14 = | 7.7994E−01 | 3.4158E+02 | 1.7698E+01 | −9.2399E+00 | 1.1933E+01 |
| A16 = | −1.5045E−01 | −2.0368E+02 | −8.6182E+00 | 5.3142E+00 | −4.1427E+00 |

| | Surface # | | | | |
|---|---|---|---|---|---|
| | 8 | 9 | 10 | 11 | 12 |
| k = | −1.5985E+01 | −3.1731E+00 | −1.6934E+00 | 9.0000E+01 | −8.8488E−01 |
| A4 = | −6.2484E−01 | −3.7573E−02 | 1.4675E−01 | −1.8733E−01 | −2.7759E−01 |
| A6 = | 1.0024E+00 | −2.3747E−01 | −2.5161E−01 | −1.2473E−01 | 1.4163E−01 |
| A8 = | −9.4918E−01 | 5.8227E−01 | 5.8842E−01 | 2.9507E−01 | −5.2011E−02 |
| A10 = | 1.1039E+00 | −3.2817E−01 | −7.6378E−01 | −2.6515E−01 | 1.1781E−02 |
| A12 = | −1.4286E+00 | −1.0822E−01 | 5.4977E−01 | 1.1712E−01 | −1.5860E−03 |
| A14 = | 9.7775E−01 | 1.6178E−01 | −1.9247E−01 | −2.4478E−02 | 1.1656E−04 |
| A16 = | −2.3740E−01 | −4.2822E−02 | 2.5477E−02 | 1.9412E−03 | −3.5807E−06 |

Figure 4:
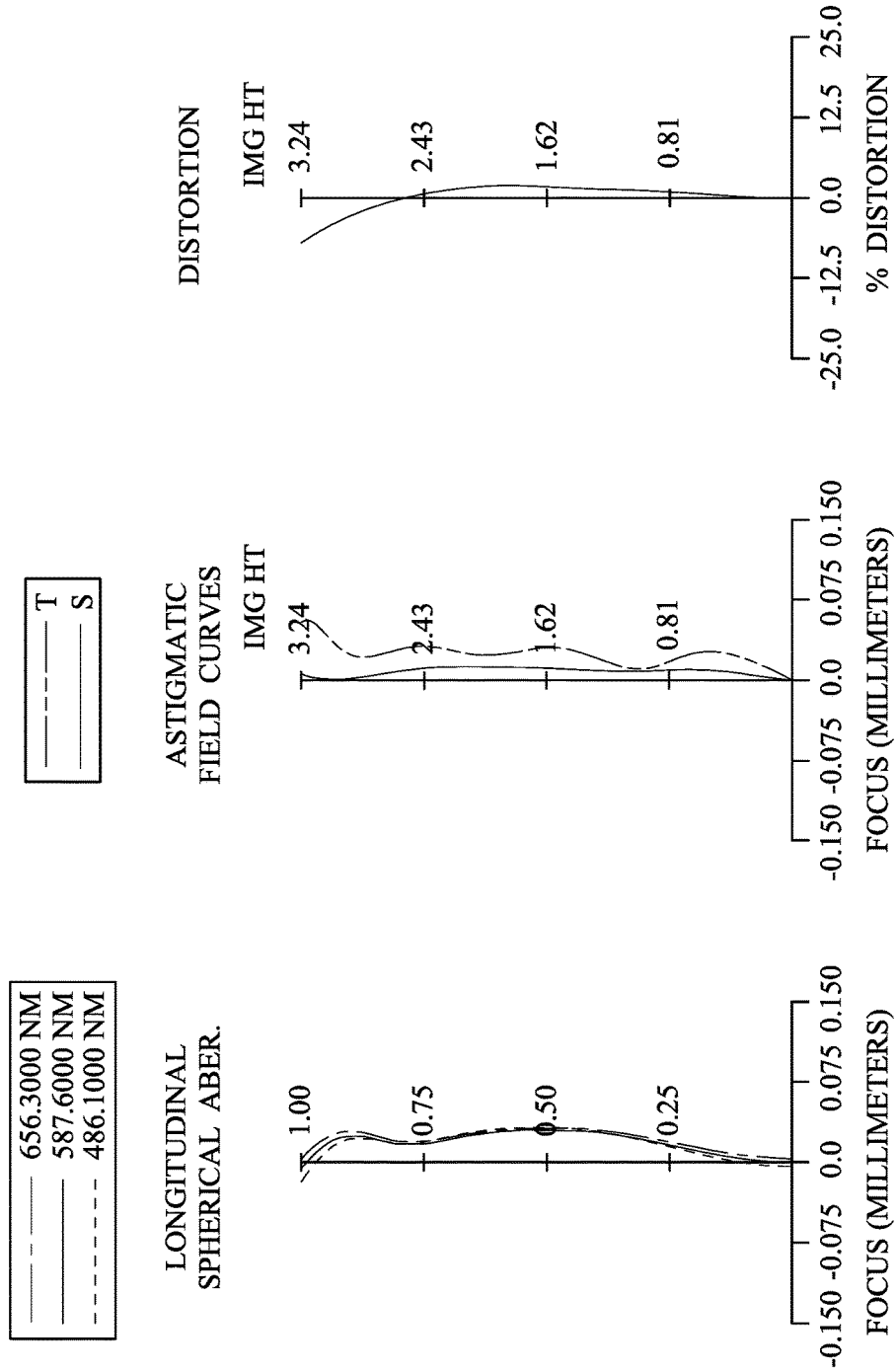
FIG. 4 shows spherical aberration curves, astigmatic field curves and a distortion curve of the imaging apparatus according to the 2nd embodiment.

In Table 1, the curvature radius, the thickness and the focal length are shown in millimeters (mm). Surface numbers 0-15 represent the surfaces sequentially arranged from FIG. 4 shows spherical aberration curves, astigmatic field curves and a distortion curve of the imaging apparatus according to the 2nd embodiment. In FIG. 3, the imaging apparatus includes an image capturing lens assembly (its reference numeral is omitted) and an image sensor 280. The image capturing lens assembly includes, in order from an object side to an image side, a first lens element 210, an aperture stop 200, a second lens element 220, a stop 201, a third lens element 230, a fourth lens element 240, a fifth lens element 250, an IR-cut filter 260 and an image surface 270, wherein the image sensor 280 is disposed on the image surface 270 of the imaging lens assembly. The imaging lens assembly includes five lens elements (210, 220, 230, 240 and 250) without additional one or more lens elements inserted between the first lens element 210 and the fifth lens element 250.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being planar in a paraxial region thereof and an image-side surface 232 being concave in a paraxial region thereof. The third lens element 230 is made of a plastic material, and has the object-side surface 231 and the image-side surface 232 being both aspheric. Furthermore, the object-side surface 231 of the third lens element 230 includes at least one concave critical point in an off-axis region thereof, and the image-side surface 232 of the third lens element 230 includes at least one convex critical point in an off-axis region thereof.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least one convex critical point in an off-axis region thereof.

The IR-cut filter 260 is made of a glass material and located between the fifth lens element 250 and the image surface 270, and will not affect the focal length of the image capturing lens assembly.

The detailed optical data of the 2nd embodiment are shown in Table 3 and the aspheric surface data are shown in Table 4 below.

TABLE 3

2nd Embodiment
f = 3.12 mm, Fno = 2.20, HFOV = 48.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.943 ASP | 0.276 | Plastic | 1.669 | 19.5 | −17.86 |
| 2 | | 1.576 ASP | 0.455 | | | | |
| 3 | Ape. Stop | Plano | 0.046 | | | | |
| 4 | Lens 2 | 4.769 ASP | 0.607 | Plastic | 1.544 | 56.0 | 2.87 |
| 5 | | −2.219 ASP | −0.022 | | | | |
| 6 | Stop | Plano | 0.256 | | | | |
| 7 | Lens 3 | ∞ ASP | 0.240 | Plastic | 1.634 | 23.8 | −5.49 |
| 8 | | 3.483 ASP | 0.284 | | | | |
| 9 | Lens 4 | −9.154 ASP | 0.863 | Plastic | 1.544 | 56.0 | 2.36 |
| 10 | | −1.164 ASP | 0.788 | | | | |
| 11 | Lens 5 | −10.974 ASP | 0.525 | Plastic | 1.559 | 40.4 | −2.36 |
| 12 | | 1.527 ASP | 0.400 | | | | |
| 13 | IR-cut filter | Plano | 0.210 | Glass | 1.517 | 64.2 | — |
| 14 | | Plano | 0.314 | | | | |
| 15 | Image | Plano | — | | | | |

Reference wavelength is 587.6 nm (d-line).
Effective radius of Surface 6 is 0.840 mm.

TABLE 4

Aspheric Coefficients

| | Surface # | | | | |
|---|---|---|---|---|---|
| | 1 | 2 | 4 | 5 | 7 |
| k = | −1.8325E+01 | −1.1129E+00 | 8.7399E+00 | 3.8273E+00 | 0.0000E+00 |
| A4 = | 4.6175E−01 | 3.0357E−01 | −1.5451E−02 | −2.4541E−01 | −8.3889E−01 |
| A6 = | −5.7879E−01 | 5.2254E−01 | 1.7832E−01 | 4.4127E−01 | 1.4552E+00 |
| A8 = | 1.1980E+00 | 1.1980E+00 | −1.6553E+00 | −7.2521E−01 | −2.7174E+00 |
| A10 = | −1.6534E+00 | 1.6805E+01 | 7.0841E+00 | 4.6405E−01 | 6.2012E+00 |
| A12 = | 1.3329E+00 | −4.4168E+01 | −1.6630E+01 | 6.2047E−01 | −1.0123E+01 |

TABLE 4-continued

| Aspheric Coefficients | | | | | |
|---|---|---|---|---|---|
| A14 = | −3.2352E−01 | 6.2930E+01 | 1.8755E+01 | −1.7893E+00 | 8.4621E+00 |
| A16 = | −1.6855E−01 | −3.6681E+01 | −7.9647E+00 | 1.1877E+00 | −2.6618E+00 |

| | Surface # | | | | |
|---|---|---|---|---|---|
| | 8 | 9 | 10 | 11 | 12 |
| k = | −1.5985E+01 | −3.1731E+00 | −1.6855E+00 | 3.0828E+01 | −7.8390E−01 |
| A4 = | −6.0008E−01 | −2.1863E−02 | 2.5838E−02 | −1.2241E−01 | −2.4836E−01 |
| A6 = | 9.2628E−01 | −1.4958E−01 | −1.9907E−01 | −1.2055E−01 | 1.0925E−01 |
| A8 = | −1.0602E+00 | 2.4510E−01 | 3.9647E−01 | 2.2587E−01 | −3.4711E−02 |
| A10 = | 1.4168E+00 | −3.9607E−02 | −4.7162E−01 | −1.6874E−01 | 6.8103E−03 |
| A12 = | −1.5674E+00 | −1.2158E−01 | 3.2741E−01 | 6.4550E−02 | −8.0207E−04 |
| A14 = | 9.1641E−01 | 8.3741E−02 | −1.1180E−01 | −1.2087E−02 | 5.1911E−05 |
| A16 = | −1.9795E−01 | −1.7593E−02 | 1.4431E−02 | 8.8053E−04 | −1.4093E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.12 | T12/T45 | 0.64 |
| Fno | 2.20 | T45/(T23 + T34) | 1.52 |
| HFOV [deg.] | 48.0 | BL/T45 | 1.17 |
| tan(HFOV) | 1.11 | (R9 + R10)/(R9 − R10) | 0.76 |
| |V3| + |V5| | 64.2 | |f/f4| + |f/f5| | 2.64 |

Figure 5:
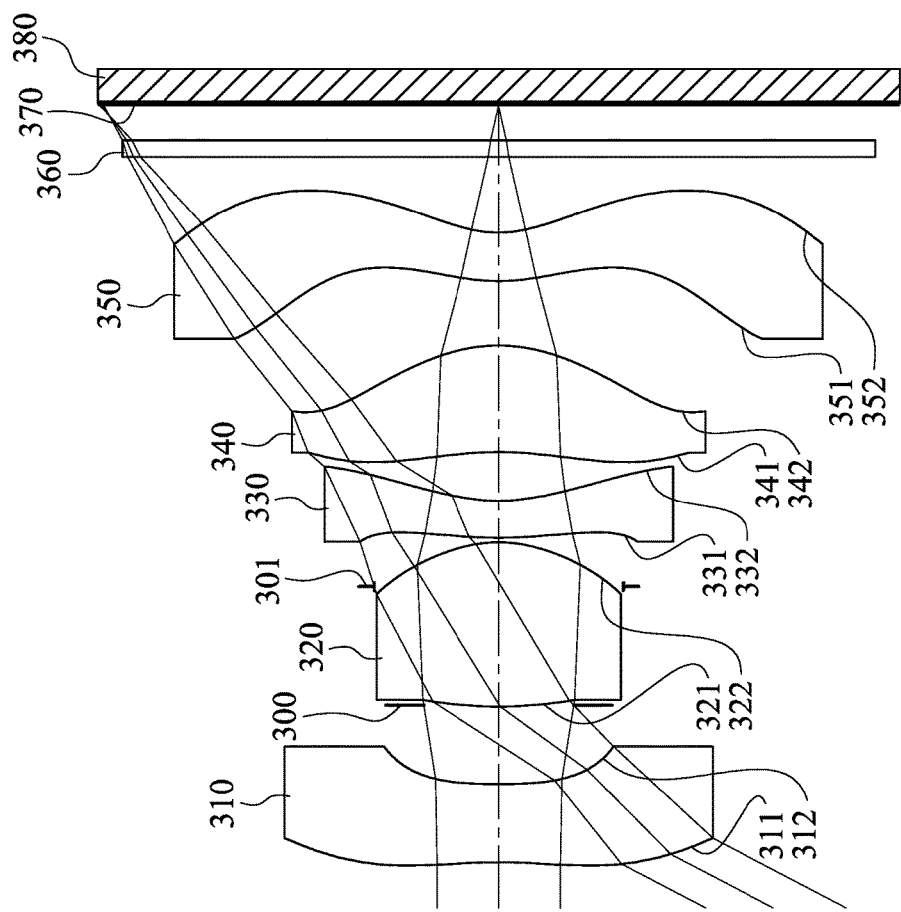
FIG. 5 is a schematic view of an imaging apparatus according to the 3rd embodiment of the present disclosure.
Figure 6:
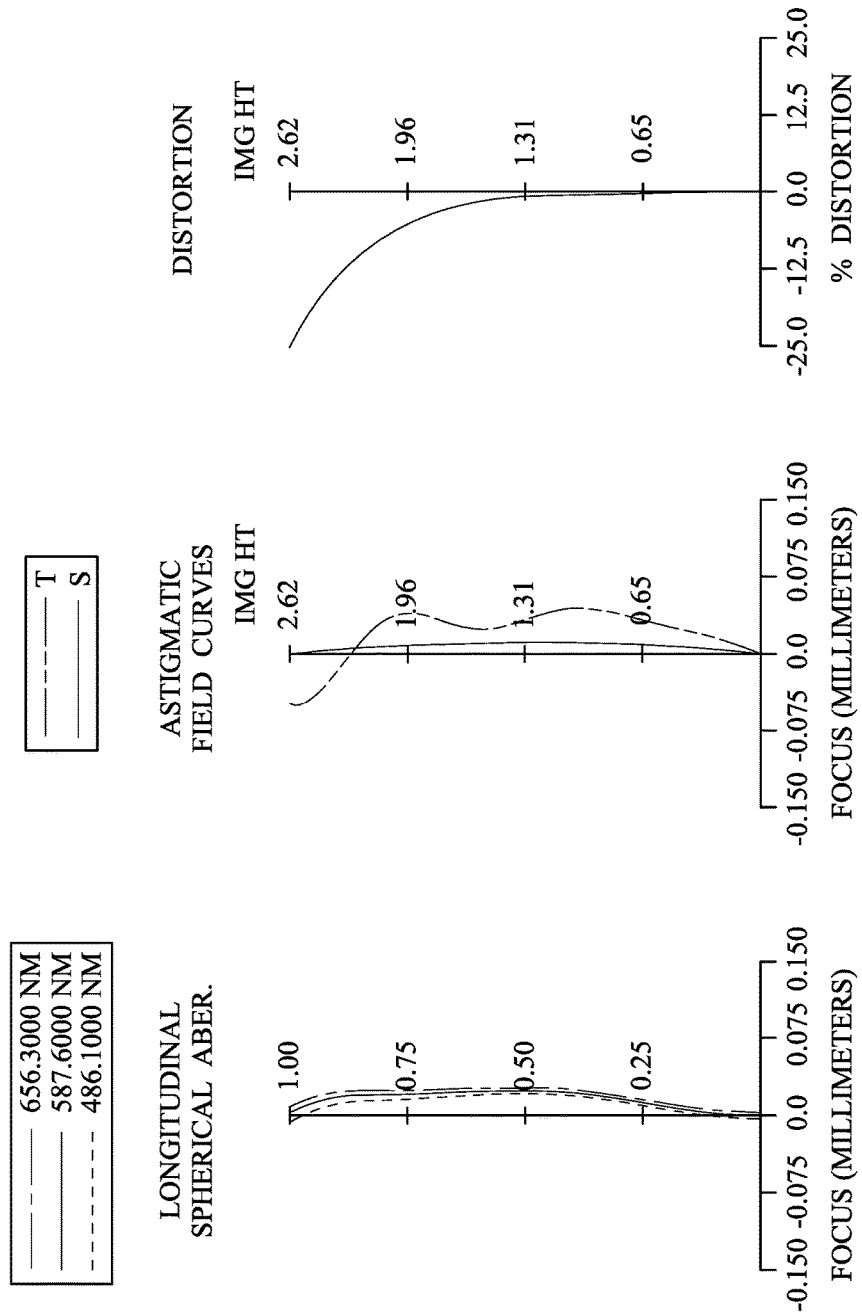
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing lens assembly (its reference numeral is omitted) and an image sensor 380. The image capturing lens assembly includes, in order from an object side to an image side, a first lens element 310, an aperture stop 300, a second lens element 320, a stop 301, a third lens element 330, a fourth lens element 340, a fifth lens element 350, an IR-cut filter 360 and an image surface 370, wherein the image sensor 380 is disposed on the image surface 370 of the imaging lens assembly. The imaging lens assembly includes five lens elements (310, 320, 330, 340 and 350) without additional one or more lens elements inserted between the first lens element 310 and the fifth lens element 350.

The first lens element 310 with negative refractive power has an object-side surface 311 being concave in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes at least one convex critical point in an off-axis region thereof.

The second lens element 320 with positive refractive power has an object-side surface 321 being convex in a paraxial region thereof and an image-side surface 322 being convex in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the object-side surface 331 of the third lens element 330 includes at least one concave critical point in an off-axis region thereof, and the image-side surface 332 of the third lens element 330 includes at least one convex critical point in an off-axis region thereof.

The fourth lens element 340 with positive refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one convex critical point in an off-axis region thereof.

The IR-cut filter 360 is made of a glass material and located between the fifth lens element 350 and the image surface 370, and will not affect the focal length of the image capturing lens assembly.

The detailed optical data of the 3rd embodiment are shown in Table 5 and the aspheric surface data are shown in Table 6 below.

TABLE 5

3rd Emodiment
f = 1.82 mm, Fno = 2.24, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.385 | ASP | 0.517 | Plastic | 1.545 | 56.1 | −3.59 |
| 2 | | 4.885 | ASP | 0.519 | | | | |
| 3 | Ape. Stop | Plano | | −0.008 | | | | |
| 4 | Lens 2 | 2.983 | ASP | 1.079 | Plastic | 1.544 | 56.0 | 1.43 |
| 5 | | −0.919 | ASP | −0.291 | | | | |
| 6 | Stop | Plano | | 0.321 | | | | |
| 7 | Lens 3 | 2.536 | ASP | 0.245 | Plastic | 1.660 | 20.4 | −3.67 |
| 8 | | 1.192 | ASP | 0.323 | | | | |
| 9 | Lens 4 | −2.189 | ASP | 0.700 | Plastic | 1.544 | 56.0 | 3.15 |
| 10 | | −1.070 | ASP | 0.423 | | | | |
| 11 | Lens 5 | 1.243 | ASP | 0.320 | Plastic | 1.660 | 20.4 | −3.93 |
| 12 | | 0.754 | ASP | 0.500 | | | | |
| 13 | IR-cut filter | Plano | | 0.110 | Glass | 1.517 | 64.2 | — |
| 14 | | Plano | | 0.242 | | | | |
| 15 | Image | Plano | | — | | | | |

Reference wavelength is 587.6 nm (d-line).
Effective radius of Surface 6 is 0.820 mm.

TABLE 6

Aspheric Coefficients

| | Surface # | | | | |
|---|---|---|---|---|---|
| | 1 | 2 | 4 | 5 | 7 |
| k = | −6.3035E+01 | 2.0494E+01 | 1.7036E+01 | −1.5373E+00 | −6.5642E+00 |
| A4 = | 1.6408E−01 | 6.5686E−01 | −5.5660E−02 | 1.5677E−02 | −4.0858E−01 |
| A6 = | −9.8998E−02 | −1.5737E+00 | 2.9973E−02 | 1.8608E−01 | 7.3788E−01 |
| A8 = | 5.0490E−02 | 7.0875E+00 | −1.2232E+00 | −6.6146E−01 | −8.9387E−01 |
| A10 = | −1.5694E−02 | −1.9236E+01 | 1.8528E+00 | 3.7671E−01 | 2.8608E−01 |
| A12 = | 2.3506E−03 | 2.9328E+01 | −1.3173E+00 | −5.2337E−02 | 1.8041E−01 |
| A14 = | −2.0039E−04 | −1.7353E+01 | | | −1.9926E−01 |

| | Surface # | | | | |
|---|---|---|---|---|---|
| | 8 | 9 | 10 | 11 | 12 |
| k = | −1.9846E+00 | 1.1835E+00 | −1.0582E+00 | −8.2024E+00 | −4.2902E+00 |
| A4 = | −4.6722E−01 | 3.3726E−01 | 7.2767E−02 | −2.6009E−01 | −1.8089E−01 |
| A6 = | 7.6538E−01 | −3.3363E−01 | 2.9902E−02 | 1.2085E−01 | 1.1074E−01 |
| A8 = | −7.8115E−01 | 2.8288E−01 | −3.5652E−02 | −6.1594E−02 | −5.2314E−02 |
| A10 = | 4.3203E−01 | 1.7621E−02 | 1.2592E−02 | 1.8920E−02 | 1.6276E−02 |
| A12 = | −1.1595E−01 | −1.9924E−01 | 3.2032E−02 | −3.8503E−04 | −3.1312E−03 |
| A14 = | 1.0028E−02 | 1.2508E−01 | −2.3592E−02 | −8.3847E−04 | 3.3206E−04 |
| A16 = | | −2.4932E−02 | 4.2519E−03 | 1.0839E−04 | −1.4556E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.82 | T12/T45 | 1.21 |
| Fno | 2.24 | T45/(T23 + T34) | 1.20 |
| HFOV [deg.] | 62.4 | BL/T45 | 2.02 |

-continued

| 3rd Embodiment | | | |
|---|---|---|---|
| tan(HFOV) | 1.91 | (R9 + R10)/(R9 − R10) | 4.08 |
| |V3| + |V5| | 40.8 | |f/f4| + |f/f5| | 1.04 |

4th Embodiment

Figure 7:
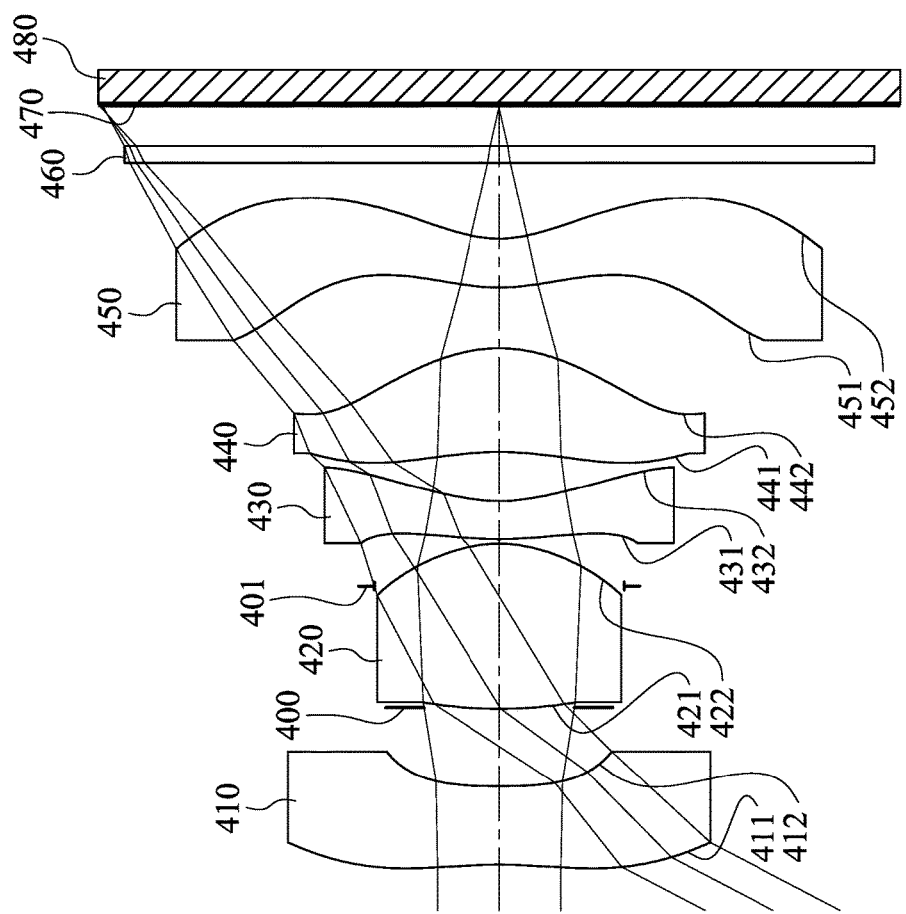
FIG. 7 is a schematic view of an imaging apparatus according to the 4th embodiment of the present disclosure.
Figure 8:
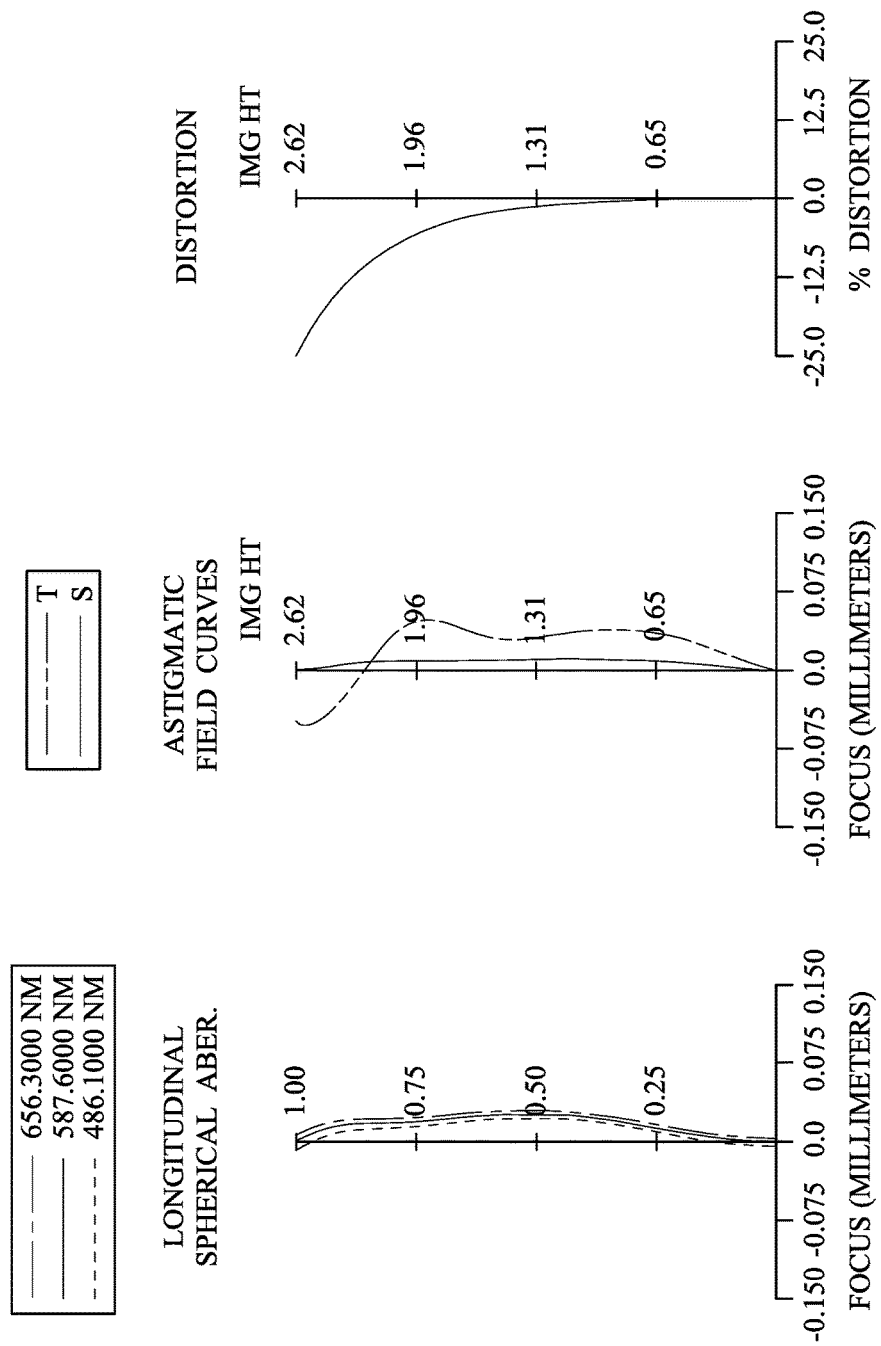
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing lens assembly (its reference numeral is omitted) and an image sensor 480. The image capturing lens assembly includes, in order from an object side to an image side, a first lens element 410, an aperture stop 400, a second lens element 420, a stop 401, a third lens element 430, a fourth lens element 440, a fifth lens element 450, an IR-cut filter 460 and an image surface 470, wherein the image sensor 480 is disposed on the image surface 470 of the imaging lens assembly. The imaging lens assembly includes five lens elements (410, 420, 430, 440 and 450) without additional one or more lens elements inserted between the first lens element 410 and the fifth lens element 450.

The first lens element 410 with negative refractive power has an object-side surface 411 being concave in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes at least one convex critical point in an off-axis region thereof.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric. Furthermore, the object-side surface 431 of the third lens element 430 includes at least one concave critical point in an off-axis region thereof, and the image-side surface 432 of the third lens element 430 includes at least one convex critical point in an off-axis region thereof.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex critical point in an off-axis region thereof.

The IR-cut filter 460 is made of a glass material and located between the fifth lens element 450 and the image surface 470, and will not affect the focal length of the image capturing lens assembly.

The detailed optical data of the 4th embodiment are shown in Table 7 and the aspheric surface data are shown in Table 8 below.

TABLE 7

4th Embodiment
f = 1.82 mm, Fno = 2.24, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.229 | ASP | 0.516 | Plastic | 1.545 | 56.1 | −3.53 |
| 2 | | 5.016 | ASP | 0.518 | | | | |
| 3 | Ape. Stop | Plano | | −0.009 | | | | |
| 4 | Lens 2 | 2.970 | ASP | 1.083 | Plastic | 1.545 | 56.1 | 1.45 |
| 5 | | −0.941 | ASP | −0.278 | | | | |
| 6 | Stop | Plano | | 0.308 | | | | |
| 7 | Lens 3 | 2.425 | ASP | 0.250 | Plastic | 1.660 | 20.4 | −3.91 |
| 8 | | 1.199 | ASP | 0.325 | | | | |
| 9 | Lens 4 | −2.053 | ASP | 0.680 | Plastic | 1.545 | 56.1 | 2.97 |
| 10 | | −1.011 | ASP | 0.398 | | | | |
| 11 | Lens 5 | 1.381 | ASP | 0.320 | Plastic | 1.660 | 20.4 | −3.69 |
| 12 | | 0.800 | ASP | 0.500 | | | | |
| 13 | IR-cut filter | Plano | | 0.110 | Glass | 1.517 | 64.2 | — |
| 14 | | Plano | | 0.274 | | | | |
| 15 | Image | Plano | | — | | | | |

Reference wavelength is 587.6 nm (d-line).
Effective radius of Surface 6 is 0.820 mm.

TABLE 8

Aspheric Coefficients

| | Surface # | | | | |
|---|---|---|---|---|---|
| | 1 | 2 | 4 | 5 | 7 |
| k = | −5.6078E+01 | 2.0401E+01 | 1.5157E+01 | −1.4206E+00 | −6.9364E+00 |
| A4 = | 1.6901E−01 | 6.2911E−01 | −3.9526E−02 | 2.5753E−03 | −4.1062E−01 |
| A6 = | −1.0699E−01 | −1.2289E+00 | −9.6677E−02 | 1.3901E−01 | 6.8298E−01 |
| A8 = | 5.9071E−02 | 5.5657E+00 | 7.4654E−02 | −3.2270E−01 | −8.6139E−01 |

TABLE 8-continued

| Aspheric Coefficients | | | | | |
|---|---|---|---|---|---|
| A10 = | −2.1023E−02 | −1.5697E+01 | −3.1159E+00 | −1.9345E−01 | 5.4879E−01 |
| A12 = | 4.0634E−03 | 2.5300E+01 | 5.9623E+00 | 2.5777E−01 | −2.9832E−01 |
| A14 = | −4.2112E−04 | −1.5607E+01 | | | 2.7637E−02 |

| | Surface # | | | | |
|---|---|---|---|---|---|
| | 8 | 9 | 10 | 11 | 12 |
| k = | −2.0378E+00 | 9.0658E−01 | −1.0857E+00 | −7.9084E+00 | −4.0507E+00 |
| A4 = | −4.1928E−01 | 3.2165E−01 | 9.9196E−02 | −2.6324E−01 | −2.0670E−01 |
| A6 = | 5.8782E−01 | −1.9930E−01 | −2.6630E−02 | 1.1566E−01 | 1.3903E−01 |
| A8 = | −4.6498E−01 | −4.4346E−03 | 6.6821E−02 | −3.0701E−02 | −6.8257E−02 |
| A10 = | 1.3963E−01 | 3.8521E−01 | −7.4796E−02 | −6.8566E−03 | 2.1889E−02 |
| A12 = | 1.7798E−02 | −4.8022E−01 | 7.2962E−02 | 8.6504E−03 | −4.3604E−03 |
| A14 = | −1.4190E−02 | 2.4004E−01 | −3.4654E−02 | −2.3082E−03 | 4.8222E−04 |
| A16 = | | −4.4215E−02 | 5.6111E−03 | 1.9964E−04 | −2.2272E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.82 | T12/T45 | 1.28 |
| Fno | 2.24 | T45/(T23 + T34) | 1.12 |
| HFOV [deg.] | 62.4 | BL/T45 | 2.22 |
| tan(HFOV) | 1.91 | (R9 + R10)/(R9 − R10) | 3.76 |
| |V3| + |V5| | 40.8 | |f/f4| + |f/f5| | 1.11 |

5th Embodiment

Figure 9:
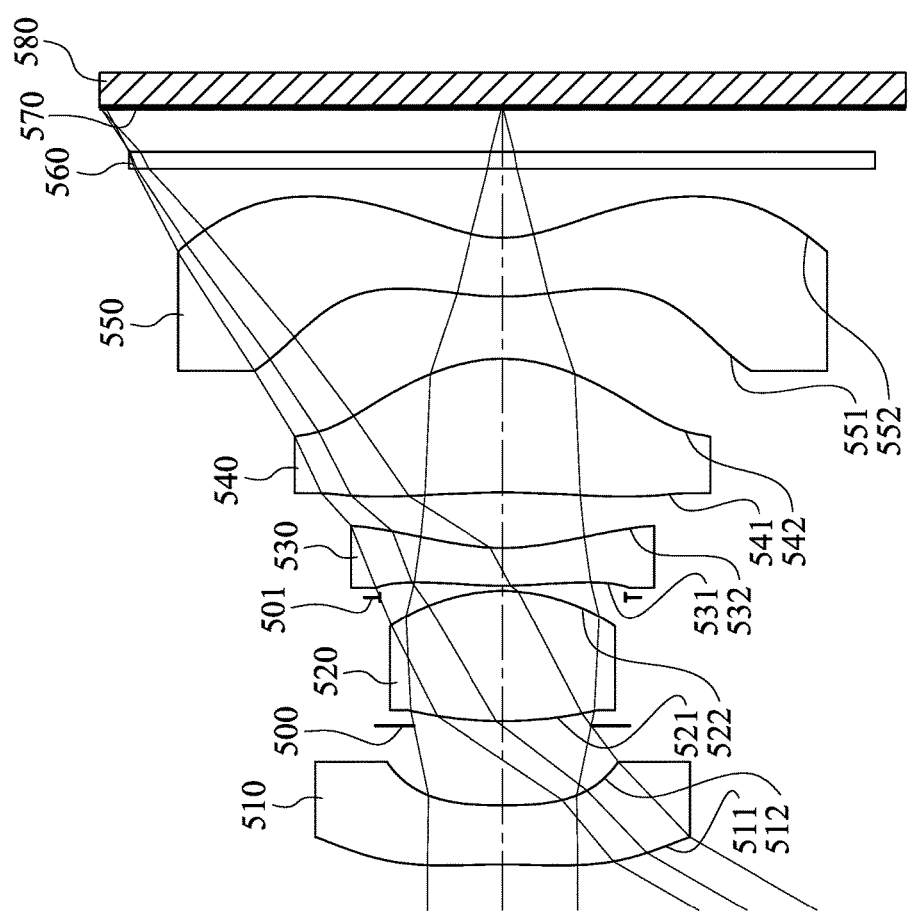
FIG. 9 is a schematic view of an imaging apparatus according to the 5th embodiment of the present disclosure.
Figure 10:
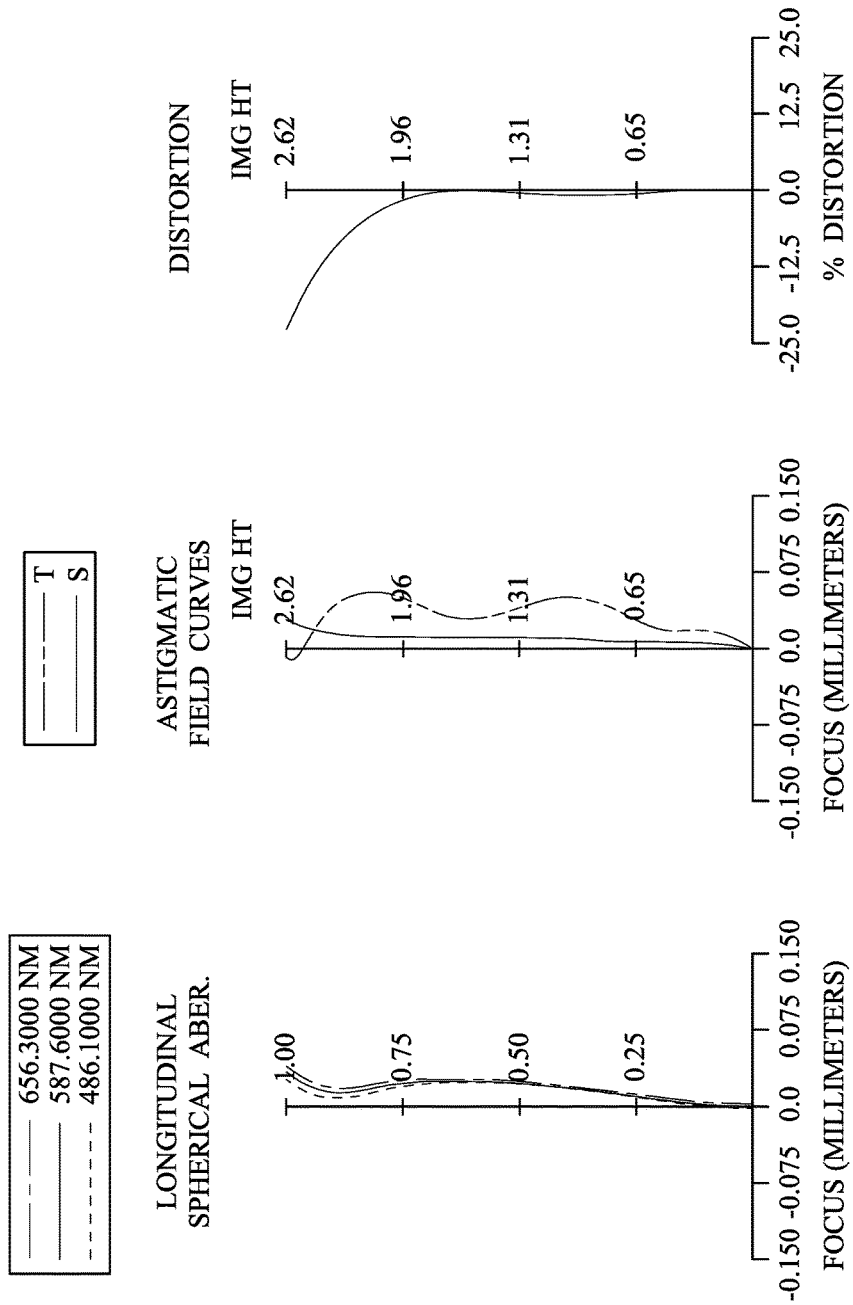
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing lens assembly (its reference numeral is omitted) and an image sensor 580. The image capturing lens assembly includes, in order from an object side to an image side, a first lens element 510, an aperture stop 500, a second lens element 520, a stop 501, a third lens element 530, a fourth lens element 540, a fifth lens element 550, an IR-cut filter 560 and an image surface 570, wherein the image sensor 580 is disposed on the image surface 570 of the imaging lens assembly. The imaging lens assembly includes five lens elements (510, 520, 530, 540 and 550) without additional one or more lens elements inserted between the first lens element 510 and the fifth lens element 550.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes at least one convex critical point in an off-axis region thereof.

The second lens element 520 with positive refractive power has an object-side surface 521 being convex in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the object-side-surface 531 of the third lens element 530 includes at least one concave critical point in an off-axis region thereof, and the image-side surface 532 of the third lens element 530 includes at least one convex critical point in an off-axis region thereof.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least one convex critical point in an off-axis region thereof.

The IR-cut filter 560 is made of a glass material and located between the fifth lens element 550 and the image surface 570, and will not affect the focal length of the image capturing lens assembly.

The detailed optical data of the 5th embodiment are shown in Table 9 and the aspheric surface data are shown in Table 10 below.

TABLE 9

5th Embodiment
f = 1.95 mm, Fno = 1.99, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.720 | ASP | 0.384 | Plastic | 1.545 | 56.1 | −3.94 |
| 2 | | 3.519 | ASP | 0.519 | | | | |
| 3 | Ape. Stop | Plano | | 0.030 | | | | |
| 4 | Lens 2 | 2.940 | ASP | 0.850 | Plastic | 1.545 | 56.1 | 1.69 |
| 5 | | −1.208 | ASP | −0.041 | | | | |
| 6 | Stop | Plano | | 0.076 | | | | |
| 7 | Lens 3 | 2.886 | ASP | 0.245 | Plastic | 1.660 | 20.4 | −4.53 |
| 8 | | 1.419 | ASP | 0.362 | | | | |
| 9 | Lens 4 | −5.714 | ASP | 0.870 | Plastic | 1.545 | 56.1 | 2.24 |
| 10 | | −1.058 | ASP | 0.409 | | | | |
| 11 | Lens 5 | 1.786 | ASP | 0.382 | Plastic | 1.660 | 20.4 | −2.67 |
| 12 | | 0.812 | ASP | 0.450 | | | | |
| 13 | IR-cut filter | Plano | | 0.110 | Glass | 1.517 | 64.2 | — |
| 14 | | Plano | | 0.289 | | | | |
| 15 | Image | Plano | | — | | | | |

Reference wavelength is 587.6 nm (d-line).
Effective radius of Surface 6 is 0.800 mm.

TABLE 10

Aspheric Coefficients

| | Surface # | | | | |
|---|---|---|---|---|---|
| | 1 | 2 | 4 | 5 | 7 |
| k = | −7.1414E+01 | −9.8039E+00 | 4.9770E+00 | −2.5741E+00 | −3.1203E+01 |
| A4 = | 3.1345E−01 | 6.6325E−01 | 5.0795E−02 | −2.4485E−01 | −4.3342E−01 |
| A6 = | −2.8704E−01 | −3.9732E−01 | −1.4441E−01 | 1.1260E+00 | 1.3656E+00 |
| A8 = | 2.1667E−01 | 6.5000E−01 | 3.6255E−01 | −3.3746E+00 | −3.1222E+00 |
| A10 = | −1.0192E−01 | | −7.2928E−01 | 4.5296E+00 | 3.3990E+00 |
| A12 = | 1.8072E−02 | | | −2.5009E+00 | −1.5344E+00 |

| | Surface # | | | | |
|---|---|---|---|---|---|
| | 8 | 9 | 10 | 11 | 12 |
| k = | −2.9693E+00 | −3.3918E+01 | −1.6269E+00 | −2.0062E+01 | −4.0823E+00 |
| A4 = | −4.5494E−01 | 8.3312E−02 | 4.9073E−02 | −1.3805E−01 | −2.0816E−01 |
| A6 = | 9.7331E−01 | −1.9127E−01 | −1.0729E−01 | −1.7075E−01 | 1.5121E−01 |
| A8 = | −1.4120E+00 | 4.3506E−01 | 2.1784E−01 | 3.5867E−01 | −7.9524E−02 |
| A10 = | 1.0702E+00 | 4.6890E−01 | −2.9604E−01 | −3.4517E−01 | 2.6421E−02 |
| A12 = | −3.2257E−01 | 2.4766E−01 | 2.6215E−01 | 1.7011E−01 | −5.3545E−03 |
| A14 = | | −5.3293E−02 | −1.1231E−01 | −4.0430E−02 | 6.0037E−04 |
| A16 = | | | 1.7537E−02 | 3.6899E−03 | −2.8239E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.95 | T12/T45 | 1.34 |
| Fno | 1.99 | T45/(T23 + T34) | 1.03 |
| HFOV [deg.] | 60.0 | BL/T45 | 2.08 |

-continued

| 5th Embodiment | | | |
|---|---|---|---|
| tan(HFOV) | 1.73 | (R9 + R10)/(R9 − R10) | 2.67 |
| |V3| + |V5| | 40.8 | |f/f4| + |f/f5| | 1.60 |

6th Embodiment

Figure 11:
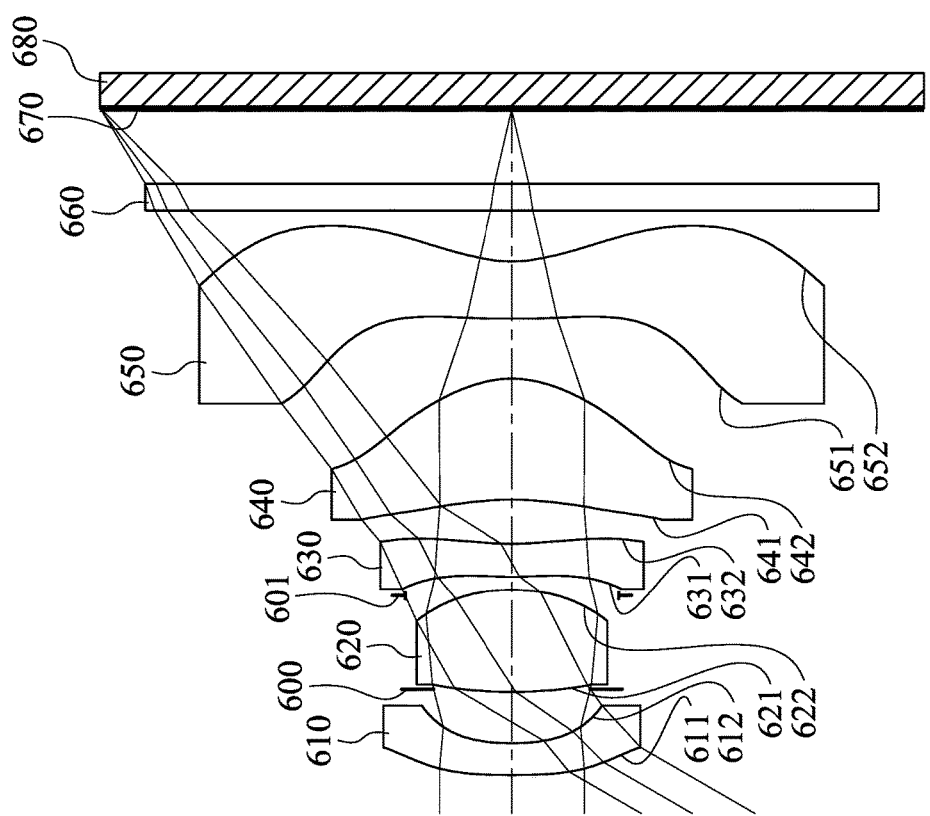
FIG. 11 is a schematic view of an imaging apparatus according to the 6th embodiment of the present disclosure.
Figure 12:
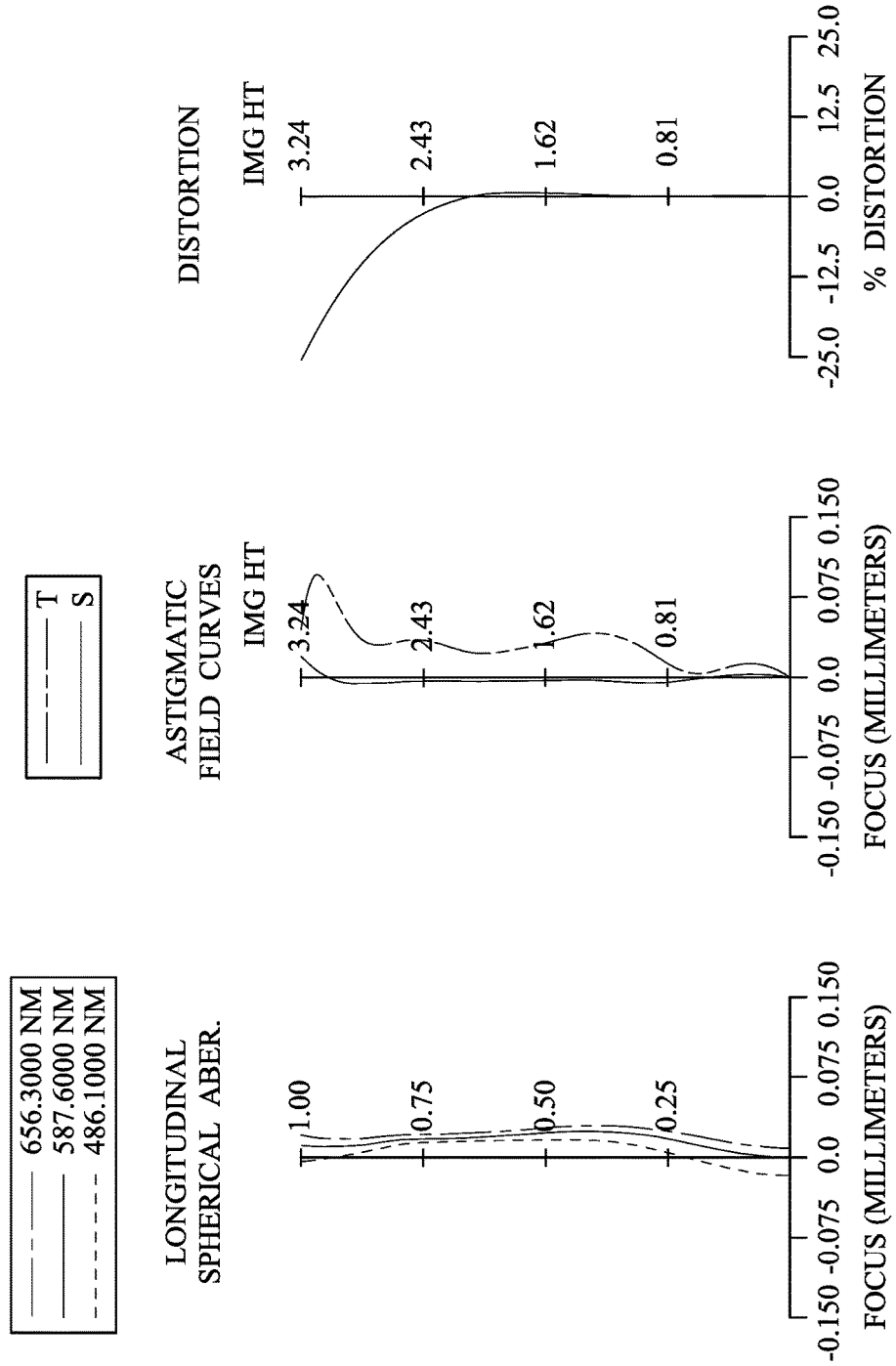
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing lens assembly (its reference numeral is omitted) and an image sensor 680. The image capturing lens assembly includes, in order from an object side to an image side, a first lens element 610, an aperture stop 600, a second lens element 620, a stop 601, a third lens element 630, a fourth lens element 640, a fifth lens element 650, an IR-cut filter 660 and an image surface 670, wherein the image sensor 680 is disposed on the image surface 670 of the imaging lens assembly. The imaging lens assembly includes five lens elements (610, 620, 630, 640 and 650) without additional one or more lens elements inserted between the first lens element 610 and the fifth lens element 650.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

Furthermore, the object-side surface 631 of the third lens element 630 includes at least one concave critical point in an off-axis region thereof, and the image-side surface 632 of the third lens element 630 includes at least one convex critical point in an off-axis region thereof.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least one convex critical point in an off-axis region thereof.

The IR-cut filter 660 is made of a glass material and located between the fifth lens element 650 and the image surface 670, and will not affect the focal length of the image capturing lens assembly.

The detailed optical data of the 6th embodiment are shown in Table 11 and the aspheric surface data are shown in Table 12 below.

TABLE 11

6th Embodiment
f = 2.51 mm, Fno = 2.20, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.129 | ASP | 0.250 | Plastic | 1.545 | 56.1 | −5.01 |
| 2 | | 1.950 | ASP | 0.425 | | | | |
| 3 | Ape. Stop | Plano | | −0.022 | | | | |
| 4 | Lens 2 | 3.865 | ASP | 0.804 | Plastic | 1.526 | 56.4 | 2.36 |
| 5 | | −1.694 | ASP | −0.046 | | | | |
| 6 | Stop | Plano | | 0.150 | | | | |
| 7 | Lens 3 | 3.499 | ASP | 0.260 | Plastic | 1.665 | 20.4 | −15.19 |
| 8 | | 2.522 | ASP | 0.346 | | | | |
| 9 | Lens 4 | −2.513 | ASP | 0.950 | Plastic | 1.544 | 56.0 | 2.07 |
| 10 | | −0.882 | ASP | 0.470 | | | | |
| 11 | Lens 5 | 7.722 | ASP | 0.456 | Plastic | 1.617 | 26.0 | −2.31 |
| 12 | | 1.175 | ASP | 0.400 | | | | |
| 13 | IR-cut filter | Plano | | 0.210 | Glass | 1.517 | 64.2 | — |
| 14 | | Plano | | 0.589 | | | | |
| 15 | Image | Plano | | — | | | | |

Reference wavelength is 587.6 nm (d-line).
Effective radius of Surface 6 is 0.840 mm.

TABLE 12

Aspheric Coefficients

| | Surface # | | | | |
|---|---|---|---|---|---|
| | 1 | 2 | 4 | 5 | 7 |
| k = | −7.7122E+01 | 6.6907E−01 | 1.1077E+01 | 1.8361E+00 | −9.0000E+01 |
| A4 = | 3.8224E−01 | 6.0966E−01 | 2.7309E−02 | −4.9334E−01 | −5.5942E−01 |
| A6 = | −3.6664E−01 | −2.7705E−01 | 5.4127E−02 | 1.4540E+00 | 6.8207E−01 |

TABLE 12-continued

| Aspheric Coefficients | | | | |
|---|---|---|---|---|
| A8 = | 3.5739E−01 | 6.2252E−01 | −3.1650E−01 | −2.4246E+00 | −1.2777E−01 |
| A10 = | −2.9032E−01 | | 2.3886E−01 | 1.9460E+00 | −9.9183E−01 |
| A12 = | 7.7971E−02 | | | −5.3287E−01 | 7.9835E−01 |
| A14 = | | | | | |
| A16 = | | | | | |

| | Surface # | | | | |
|---|---|---|---|---|---|
| | 8 | 9 | 10 | 11 | 12 |
| k = | −7.7560E+00 | −1.1630E+01 | −1.6563E+00 | 9.9052E+00 | −9.8159E−01 |
| A4 = | −3.1573E−01 | 7.3703E−02 | 1.2845E−01 | 3.5376E−02 | −3.0195E−01 |
| A6 = | 2.6786E−01 | −1.8551E−01 | −3.2933E−01 | −3.4148E−01 | 1.4910E−01 |
| A8 = | 9.9793E−02 | 2.5791E−01 | 4.6726E−01 | 3.8261E−01 | −5.4300E−02 |
| A10 = | −3.9468E−01 | −1.0641E−01 | −4.6285E−01 | −2.4095E−01 | 1.2783E−02 |
| A12 = | 1.9958E−01 | −3.1766E−02 | 2.9487E−01 | 8.3546E−02 | −1.8503E−03 |
| A14 = | | 2.1261E−02 | −9.6697E−02 | −1.4531E−02 | 1.4833E−04 |
| A16 = | | | 1.2152E−02 | 9.8901E−04 | −4.9742E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.51 | T12/T45 | 0.86 |
| Fno | 2.20 | T45/(T23 + T34) | 1.04 |
| HFOV [deg.] | 60.0 | BL/T45 | 2.55 |
| tan(HFOV) | 1.73 | (R9 + R10)/(R9 − R10) | 1.36 |
| |V3| + |V5| | 46.4 | |f/f4| + |f/f5| | 2.30 |

7th Embodiment

Figure 13:
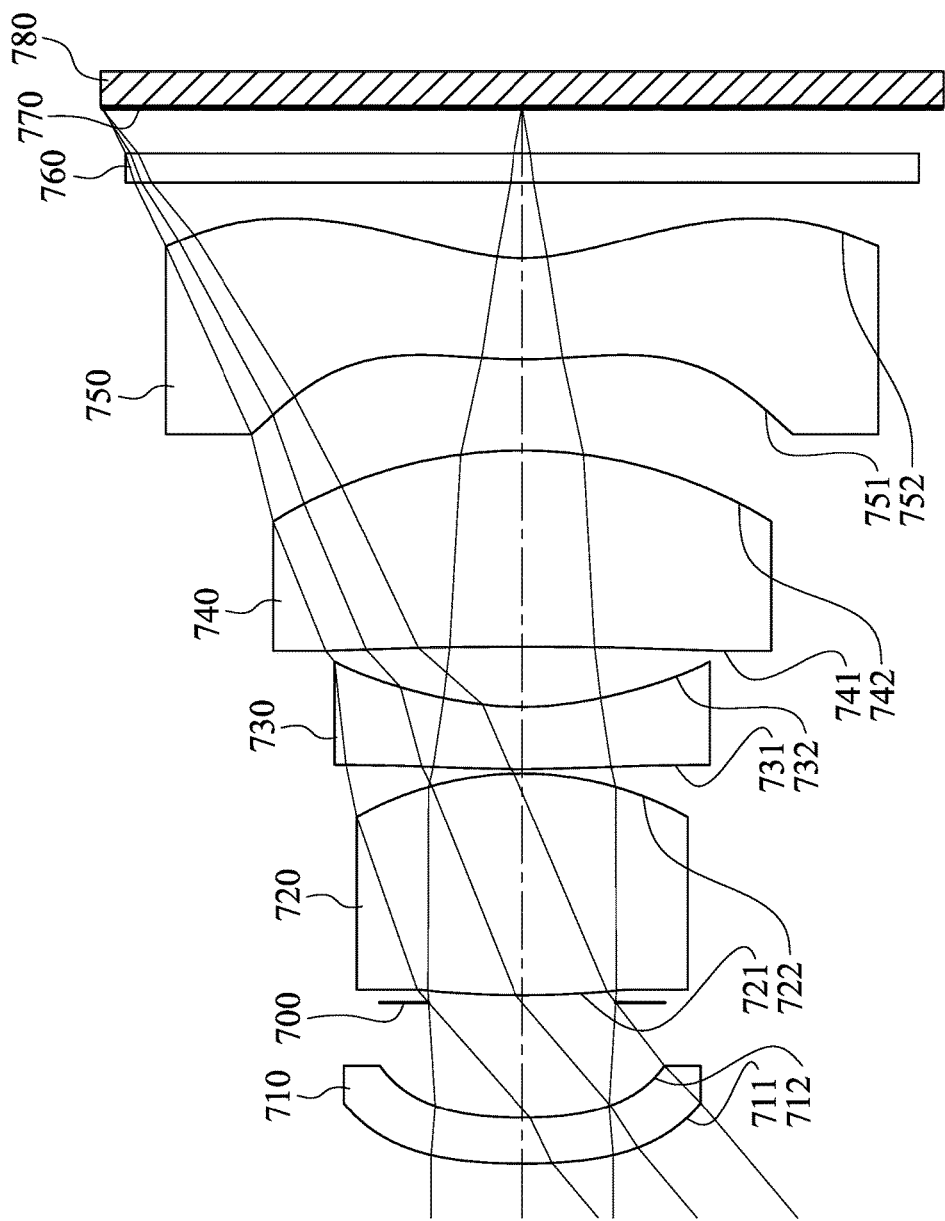
FIG. 13 is a schematic view of an imaging apparatus according to the 7th embodiment of the present disclosure.
Figure 14:
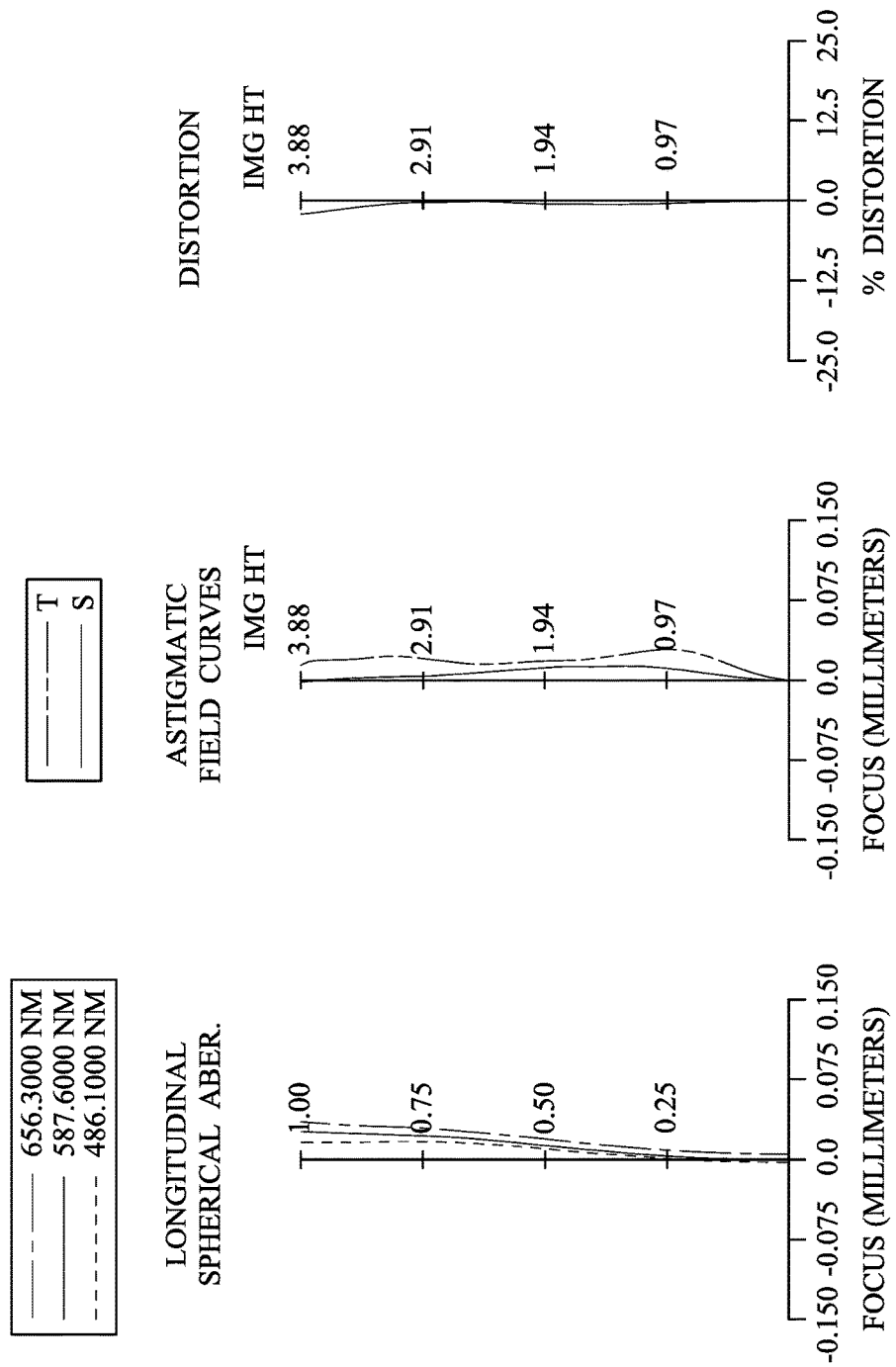
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing lens assembly (its reference numeral is omitted) and an image sensor 780. The image capturing lens assembly includes, in order from an object side to an image side, a first lens element 710, an aperture stop 700, a second lens element 720, a third lens element 730, a fourth lens element 740, a fifth lens element 750, an IR-cut filter 760 and an image surface 770, wherein the image sensor 780 is disposed on the image surface 770 of the imaging lens assembly. The imaging lens assembly includes five lens elements (710, 720, 730, 740 and 750) without additional one or more lens elements inserted between the first lens element 710 and the fifth lens element 750.

The first lens element 710 with negative refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a glass material, and has the object-side surface 721 and the image-side surface 722 being both spherical.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric. Furthermore, the object-side surface 731 of the third lens element 730 includes at least one concave critical point in an off-axis region thereof.

The fourth lens element 740 with positive refractive power has an object-side surface 741 being concave in a paraxial region thereof and an image-side surface 742 being convex in a paraxial region thereof. The fourth lens element 740 is made of a glass material, and has the object-side surface 741 and the image-side surface 742 being both spherical.

The fifth lens element 750 with negative refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least one convex critical point in an off-axis region thereof.

The IR-cut filter 760 is made of a glass material and located between the fifth lens element 750 and the image surface 770, and will not affect the focal length of the image capturing lens assembly.

The detailed optical data of the 7th embodiment are shown in Table 13 and the aspheric surface data are shown in Table 14 below.

TABLE 13

7th Embodiment
f = 4.70 mm, Fno = 2.80, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.045 ASP | 0.423 | Plastic | 1.545 | 56.1 | −22.73 |
| 2 | | 3.962 ASP | 1.063 | | | | |
| 3 | Ape. Stop | Plano | 0.069 | | | | |
| 4 | Lens 2 | 9.317 | 2.043 | Glass | 1.729 | 54.7 | 3.43 |
| 5 | | −3.099 | 0.040 | | | | |
| 6 | Lens 3 | 10.062 ASP | 0.573 | Plastic | 1.639 | 23.3 | −6.66 |
| 7 | | 2.924 ASP | 0.554 | | | | |
| 8 | Lens 4 | −40.675 | 1.810 | Glass | 1.804 | 46.5 | 5.92 |
| 9 | | −4.346 | 0.838 | | | | |
| 10 | Lens 5 | 5.098 ASP | 0.931 | Plastic | 1.639 | 23.3 | −5.52 |
| 11 | | 1.937 ASP | 0.700 | | | | |
| 12 | IR-cut filter | Plano | 0.270 | Glass | 1.517 | 64.2 | — |
| 13 | | Plano | 0.420 | | | | |
| 14 | Image | Plano | — | | | | |

Reference wavelength is 587.6 nm (d-line).

TABLE 14

Aspheric Coefficients

| | Surface # | | | | | |
|---|---|---|---|---|---|---|
| | 1 | 2 | 6 | 7 | 10 | 11 |
| k = | 5.7866E+00 | 6.3864E+00 | 2.0650E+01 | 8.0748E−02 | −5.8066E+00 | −5.4977E+00 |
| A4 = | 3.3665E−02 | 4.1485E−02 | −3.8669E−02 | −4.6308E−02 | −6.8113E−02 | −2.8941E−02 |
| A6 = | 5.0629E−03 | 2.2799E−02 | 2.5928E−02 | 2.6319E−02 | 1.7230E−02 | 6.3891E−03 |
| A8 = | −3.8695E−03 | −2.1916E−02 | −1.9201E−02 | −1.3971E−02 | −5.2225E−03 | −1.1188E−03 |
| A10 = | 1.4875E−03 | 1.1589E−02 | 9.4567E−03 | 5.0911E−03 | 1.2826E−03 | 1.3257E−04 |
| A12 = | −1.3920E−04 | −1.5205E−03 | −2.4788E−03 | −1.0109E−03 | −2.2048E−04 | −1.0313E−05 |
| A14 = | | | 2.6182E−04 | 8.3455E−05 | 2.2285E−05 | 4.6884E−07 |
| A16 = | | | | | −9.2896E−07 | −9.0329E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.70 | T12/T45 | 1.35 |
| Fno | 2.80 | T45/(T23 + T34) | 1.41 |
| HFOV [deg.] | 40.0 | BL/T45 | 1.66 |
| tan(HFOV) | 0.84 | (R9 + R10)/(R9 − R10) | 2.23 |
| |V3| + |V5| | 46.6 | |f/f4| + |f/f5| | 1.65 |

8th Embodiment

Figure 15:
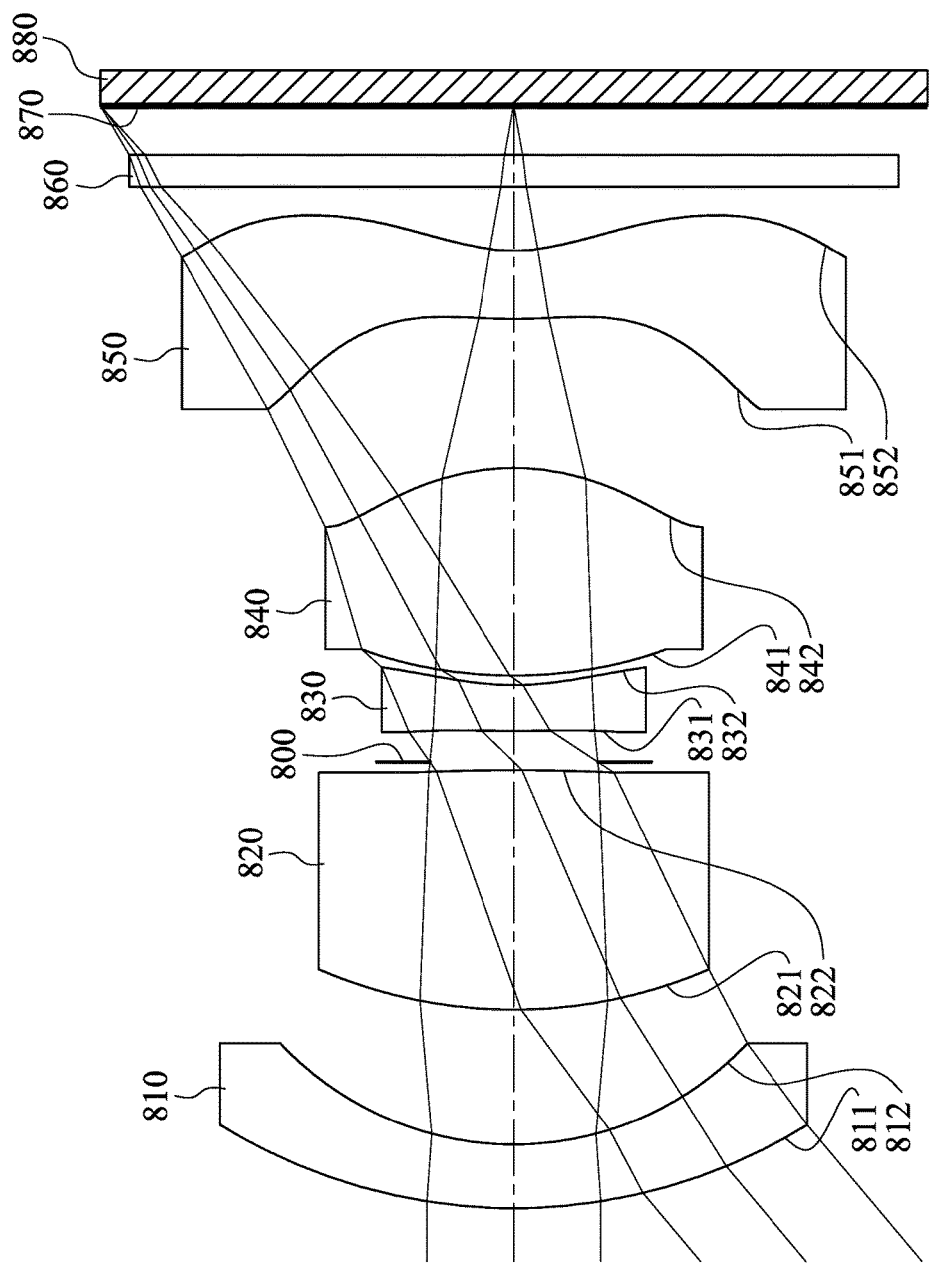
FIG. 15 is a schematic view of an imaging apparatus according to the 8th embodiment of the present disclosure.
Figure 16:
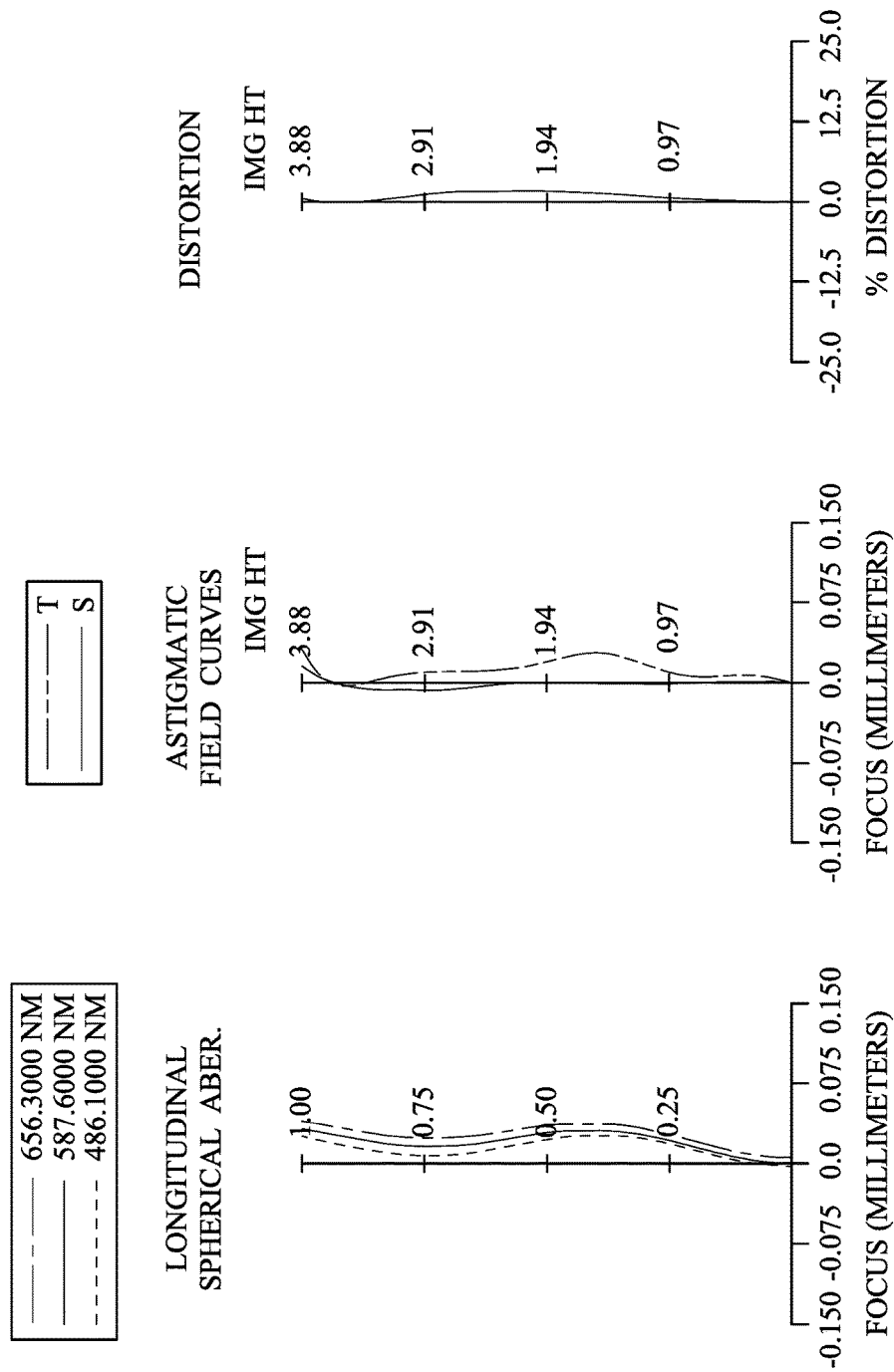
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment in FIG. 15, the imaging apparatus includes an image capturing lens assembly (its reference numeral is omitted) and an image sensor 880. The image capturing lens assembly includes, in order from an object side to an image side, a first lens element 810, a second lens element 820, an aperture stop 800, a third lens element 830, a fourth lens element 840, a fifth lens element 850, an IR-cut filter 860 and an image surface 870, wherein the image sensor 880 is disposed on the image surface 870 of the imaging lens assembly. The imaging lens assembly includes five lens elements (810, 820, 830, 840 and 850) without additional one or more lens elements inserted between the first lens element 810 and the fifth lens element 850.

The first lens element 810 with negative refractive power has an object-side surface 811 being convex in a paraxial region thereof and an image-side surface 812 being concave in a paraxial region thereof. The first lens element 810 is made of a glass material, and has the object-side surface 811 and the image-side surface 812 being both spherical.

The second lens element 820 with positive refractive power has an object-side surface 821 being convex in a paraxial region thereof and an image-side surface 822 being convex in a paraxial region thereof. The second lens element 820 is made of a glass material, and has the object-side surface 821 and the image-side surface 822 being both spherical.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the object-side surface 831 of the third lens element 830 includes at least one concave critical point in an off-axis region thereof, and the image-side surface 832 of the third lens element 830 includes at least one convex critical point in an off-axis region thereof.

The fourth lens element 840 with positive refractive power has an object-side surface 841 being convex in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the image-side surface 852 of the fifth lens element 850 includes at least one convex critical point in an off-axis region thereof.

The IR-cut filter 860 is made of a glass material and located between the fifth lens element 850 and the image surface 870, and will not affect the focal length of the image capturing lens assembly.

The detailed optical data of the 8th embodiment are shown in Table 15 and the aspheric surface data are shown in Table 16 below.

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.58 | T12/T45 | 0.91 |
| Fno | 2.80 | T45/(T23 + T34) | 3.08 |
| HFOV [deg.] | 40.0 | BL/T45 | 0.97 |
| tan(HFOV) | 0.84 | (R9 + R10)/(R9 − R10) | 1.90 |
| |V3| + |V5| | 76.4 | |f/f4| + |f/f5| | 2.56 |

9th Embodiment

Figure 17:
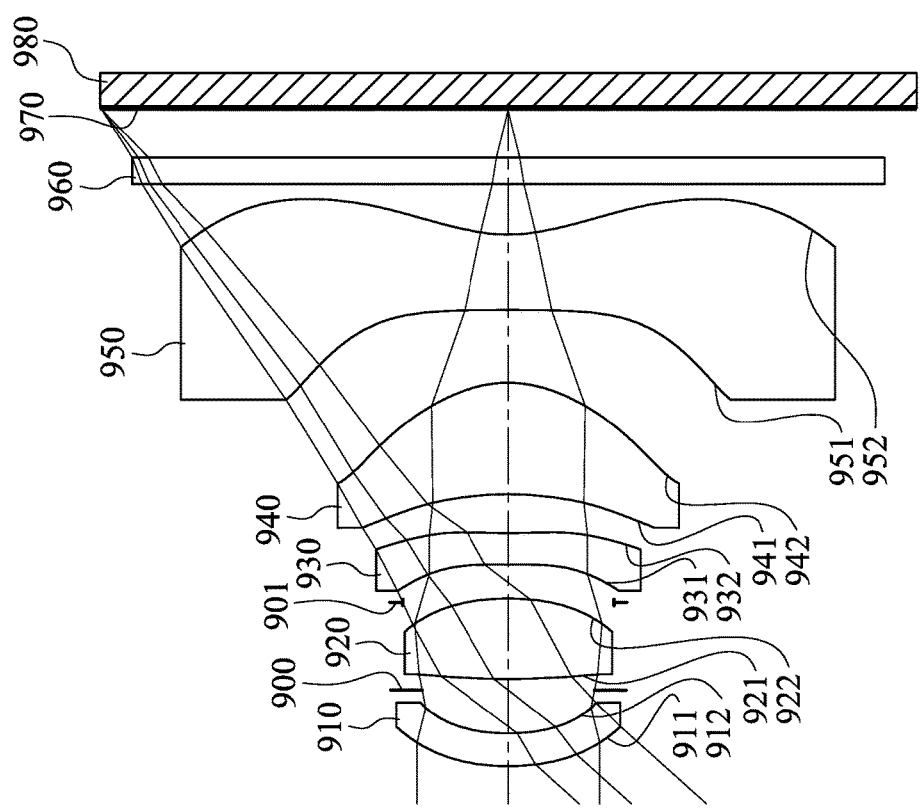
FIG. 17 is a schematic view of an imaging apparatus according to the 9th embodiment of the present disclosure.
Figure 18:
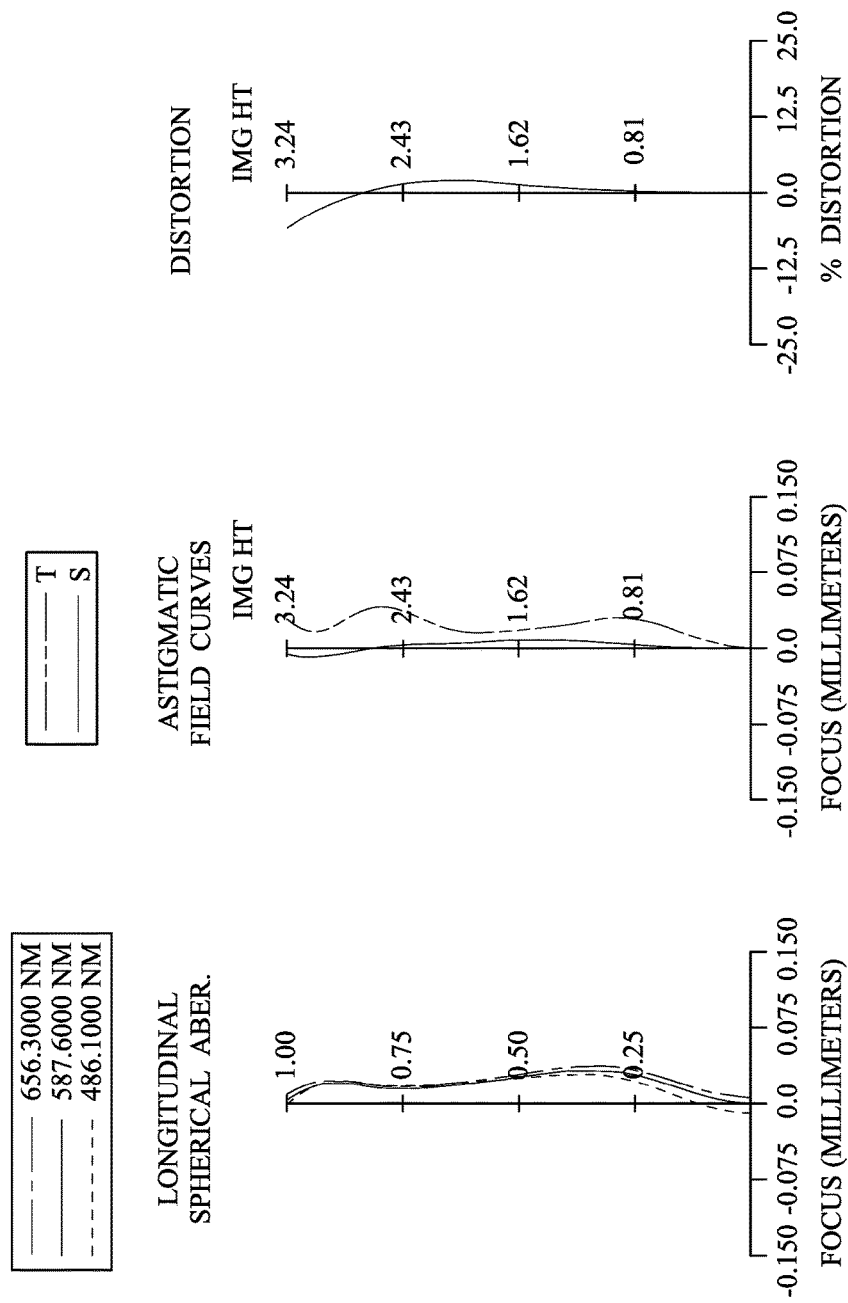
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing lens assembly (its reference numeral is omitted) and an image sensor 980. The

TABLE 15

8th Embodiment
f = 4.58 mm, Fno = 2.80, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 5.237 | 0.600 | Glass | 1.804 | 46.5 | −9.92 |
| 2 | | 3.000 | 1.268 | | | | |
| 3 | Lens 2 | 4.609 | 2.256 | Glass | 1.806 | 40.9 | 4.81 |
| 4 | | −19.054 | 0.076 | | | | |
| 5 | Ape. Stop | Plano | 0.292 | | | | |
| 6 | Lens 3 | 14.561 ASP | 0.430 | Plastic | 1.660 | 20.4 | −5.00 |
| 7 | | 2.659 ASP | 0.087 | | | | |
| 8 | Lens 4 | 3.662 ASP | 1.956 | Plastic | 1.544 | 56.0 | 2.93 |
| 9 | | −2.286 ASP | 1.400 | | | | |
| 10 | Lens 5 | 5.246 ASP | 0.643 | Plastic | 1.544 | 56.0 | −4.61 |
| 11 | | 1.623 ASP | 0.600 | | | | |
| 12 | IR-cut filter | Plano | 0.300 | Glass | 1.517 | 64.2 | — |
| 13 | | Plano | 0.462 | | | | |
| 14 | Image | Plano | — | | | | |

Reference wavelength is 587.6 nm (d-line).

TABLE 16

Aspheric Coefficients

| | Surface # | | | | |
|---|---|---|---|---|---|
| 6 | 7 | 8 | 9 | 10 | 11 |
| k = 4.5741E+01 | −5.6043E+00 | −3.7269E+01 | −1.4935E+00 | −8.9380E+01 | −5.7809E+00 |
| A4 = −8.5953E−02 | −1.0238E−01 | 9.5201E−03 | −1.4970E−02 | −7.6399E−02 | −3.5193E−02 |
| A6 = 1.5251E−01 | 1.7927E−01 | 3.1717E−02 | 1.4631E−02 | 6.8066E−03 | 6.4399E−03 |
| A8 = −3.3294E−01 | −2.1364E−01 | −2.9169E−02 | −1.8036E−02 | 1.2170E−03 | −7.3951E−04 |
| A10 = 4.2778E−01 | 1.5226E−01 | 1.4321E−02 | 1.5214E−02 | 6.9073E−05 | 3.5207E−05 |
| A12 = −3.0832E−01 | −6.1433E−02 | −4.0588E−03 | −6.9992E−03 | −2.3745E−04 | 3.5880E−07 |
| A14 = 9.5268E−02 | 1.0536E−02 | 5.6725E−04 | 1.7339E−03 | 5.3795E−05 | −1.1873E−07 |
| A16 = | | −2.8248E−05 | −1.7120E−04 | −3.5458E−06 | 5.5059E−09 | image capturing lens assembly includes, in order from an object side to an image side, a first lens element 910, an aperture stop 900, a second lens element 920, a stop 901, a third lens element 930, a fourth lens element 940, a fifth lens element 950, an IR-cut filter 960 and an image surface 970, wherein the image sensor 980 is disposed on the image surface 970 of the imaging lens assembly. The imaging lens assembly includes five lens elements (910, 920, 930, 940 and 950) without additional one or more lens elements inserted between the first lens element 910 and the fifth lens element 950.

The first lens element 910 with negative refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of a plastic material, and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of a plastic material, and has the object-side surface 931 and the image-side surface 932 being both aspheric. Furthermore, the image-side surface 932 of the third lens element 930 includes at least one convex critical point in an off-axis region thereof.

The fourth lens element 940 with positive refractive power has an object-side surface 941 being concave in a paraxial region thereof and an image-side surface 942 being convex in a paraxial region thereof. The fourth lens element 940 is made of a plastic material, and has the object-side surface 941 and the image-side surface 942 being both aspheric.

The fifth lens element 950 with negative refractive power has an object-side surface 951 being concave in a paraxial region thereof and an image-side surface 952 being concave in a paraxial region thereof. The fifth lens element 950 is made of a plastic material, and has the object-side surface 951 and the image-side surface 952 being both aspheric. Furthermore, the image-side surface 952 of the fifth lens element 950 includes at least one convex critical point in an off-axis region thereof.

The IR-cut filter 960 is made of a glass material and located between the fifth lens element 950 and the image surface 970, and will not affect the focal length of the image capturing lens assembly.

The detailed optical data of the 9th embodiment are shown in Table 17 and the aspheric surface data are shown in Table 18 below.

TABLE 17

9th Embodiment
f = 3.08 mm, Fno = 2.12, HFOV = 48.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.844 ASP | 0.261 | Plastic | 1.660 | 20.4 | −29.32 |
| 2 | | 1.589 ASP | 0.347 | | | | |
| 3 | Ape. Stop | Plano | 0.089 | | | | |
| 4 | Lens 2 | 6.260 ASP | 0.639 | Plastic | 1.544 | 56.0 | 2.92 |
| 5 | | −2.051 ASP | −0.031 | | | | |
| 6 | Stop | Plano | 0.300 | | | | |
| 7 | Lens 3 | −100.000 ASP | 0.250 | Plastic | 1.669 | 19.5 | −7.95 |
| 8 | | 5.622 ASP | 0.308 | | | | |
| 9 | Lens 4 | −2.617 ASP | 0.890 | Plastic | 1.544 | 56.0 | 2.31 |
| 10 | | −0.951 ASP | 0.578 | | | | |
| 11 | Lens 5 | −17.098 ASP | 0.599 | Plastic | 1.559 | 40.4 | −2.31 |
| 12 | | 1.413 ASP | 0.400 | | | | |
| 13 | IR-cut filter | Plano | 0.210 | Glass | 1.517 | 64.2 | — |
| 14 | | Plano | 0.399 | | | | |
| 15 | Image | Plano | — | | | | |

Reference wavelength is 587.6 nm (d-line).
Effective radius of Surface 6 is 0.840 mm.

TABLE 18

Aspheric Coefficients

| | Surface # | | | | |
|---|---|---|---|---|---|
| | 1 | 2 | 4 | 5 | 7 |
| k = | −1.8319E+01 | −1.1137E+00 | 8.7399E+00 | 3.0765E+00 | 0.0000E+00 |
| A4 = | 4.7267E−01 | 2.7372E−01 | −3.1697E−02 | −1.6745E−01 | −6.0923E−01 |
| A6 = | −6.5765E−01 | 1.1372E−01 | 2.9586E−01 | −1.5018E−01 | 3.6588E−01 |
| A8 = | 1.3272E+00 | 3.8318E−01 | −2.2565E+00 | 1.8407E+00 | −4.5766E−01 |
| A10 = | −1.9360E+00 | −2.5813E+00 | 8.9185E+00 | −6.4508E+00 | 2.4222E+00 |
| A12 = | 1.9476E+00 | 1.1377E+01 | −1.9832E+01 | 1.2013E+01 | −4.5693E+00 |
| A14 = | −1.1216E+00 | −2.0147E+01 | 2.2593E+01 | −1.1900E+01 | 3.5450E+00 |
| A16 = | 2.0674E−01 | 1.3793E+01 | −9.9267E+00 | 4.9416E+00 | −9.6328E−01 |

TABLE 18-continued

| Aspheric Coefficients | | | | | |
|---|---|---|---|---|---|
| | Surface # | | | | |
| | 8 | 9 | 10 | 11 | 12 |
| k = | −1.5985E+01 | −3.1731E+00 | −1.4453E+00 | 1.8972E+01 | −1.2441E+00 |
| A4 = | −3.9214E−01 | 6.0880E−02 | 6.4124E−02 | 2.7722E−02 | −1.9201E−01 |
| A6 = | 1.1787E−01 | −2.1053E−01 | −1.1934E−01 | −2.2042E−01 | 7.6485E−02 |
| A8 = | 2.2967E−01 | 1.2598E−02 | 2.3761E−02 | 2.1524E−01 | −2.0349E−02 |
| A10 = | −7.7093E−02 | 3.3256E−01 | 8.6615E−02 | −1.1417E−01 | 3.3451E−03 |
| A12 = | −1.4060E−01 | −3.1710E−01 | −1.1115E−01 | 3.2718E−02 | −3.2815E−04 |
| A14 = | 6.3936E−02 | 1.1272E−01 | 5.8285E−02 | −4.5633E−03 | 1.7333E−05 |
| A16 = | 5.8149E−03 | −1.4451E−02 | −1.0758E−02 | 2.3585E−04 | −3.6316E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.08 | T12/T45 | 0.75 |
| Fno | 2.12 | T45/(T23 + T34) | 1.00 |
| HFOV [deg.] | 48.0 | BL/T45 | 1.75 |
| tan(HFOV) | 1.11 | (R9 + R10)/(R9 − R10) | 0.85 |
| |V3| + |V5| | 59.9 | |f/f4| + |f/f5| | 2.67 |

10th Embodiment

Figure 20:
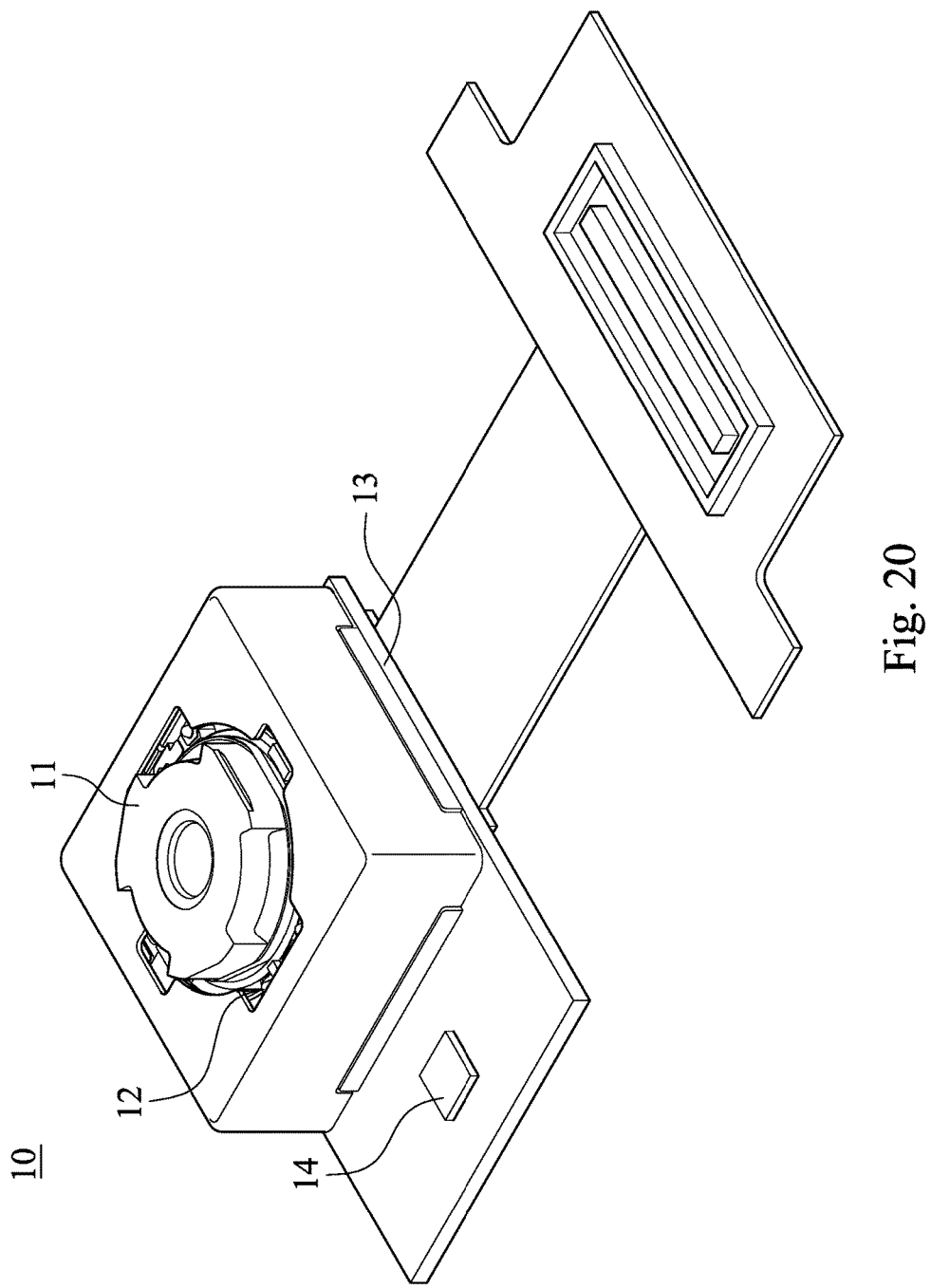
FIG. 20 is a three-dimensional schematic view of an imaging apparatus according to the 10th embodiment of the present disclosure.

FIG. 20 is a three-dimensional schematic view of an imaging apparatus 10 according to the 10th embodiment of the present disclosure. In FIG. 20, the imaging apparatus 10 of the 10th embodiment is a camera module, the imaging apparatus 10 includes an imaging lens assembly 11, a driving apparatus 12 and an image sensor 13, wherein the imaging lens assembly 11 includes the image capturing lens assembly of the 1st embodiment and a lens barrel (not shown in drawings) for carrying the image capturing assembly 11. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing lens assembly can obtain a favorable imaging position by the driving apparatus 12 so as to capture clear images when the imaged object is disposed at different object distances.

The imaging apparatus 10 can include the image sensor 13 located on the image surface of the image capturing lens assembly, such as CMOS and CCD, with superior photo-sensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyroscope, and a Hall Effect sensor. In the 10th embodiment, the image stabilization module 14 is a gyroscope, but is not limited thereto. Therefore, the variation of different axial directions of the image capturing lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

11th Embodiment

Figure 21A:
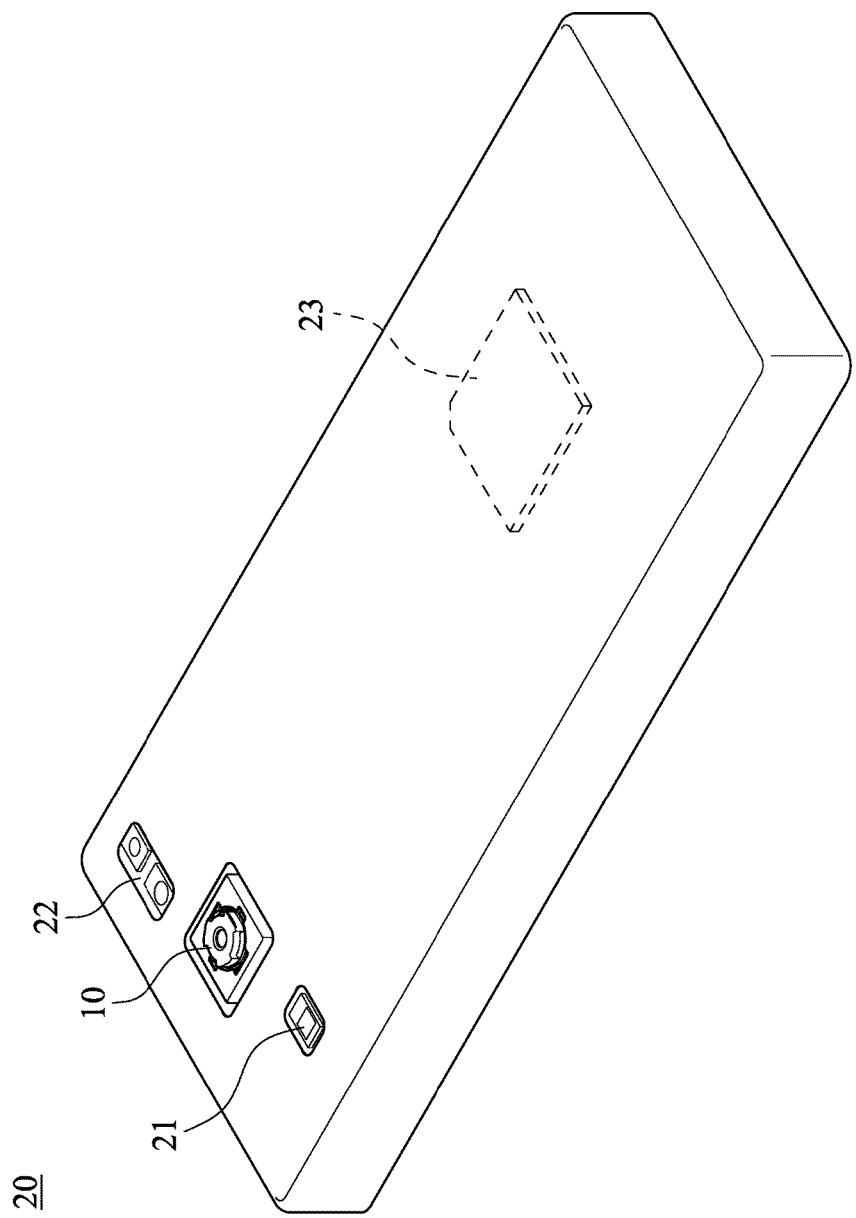
FIG. 21A is a schematic view of one side of an electronic device according to the 11th embodiment of the present disclosure.
Figure 21B:
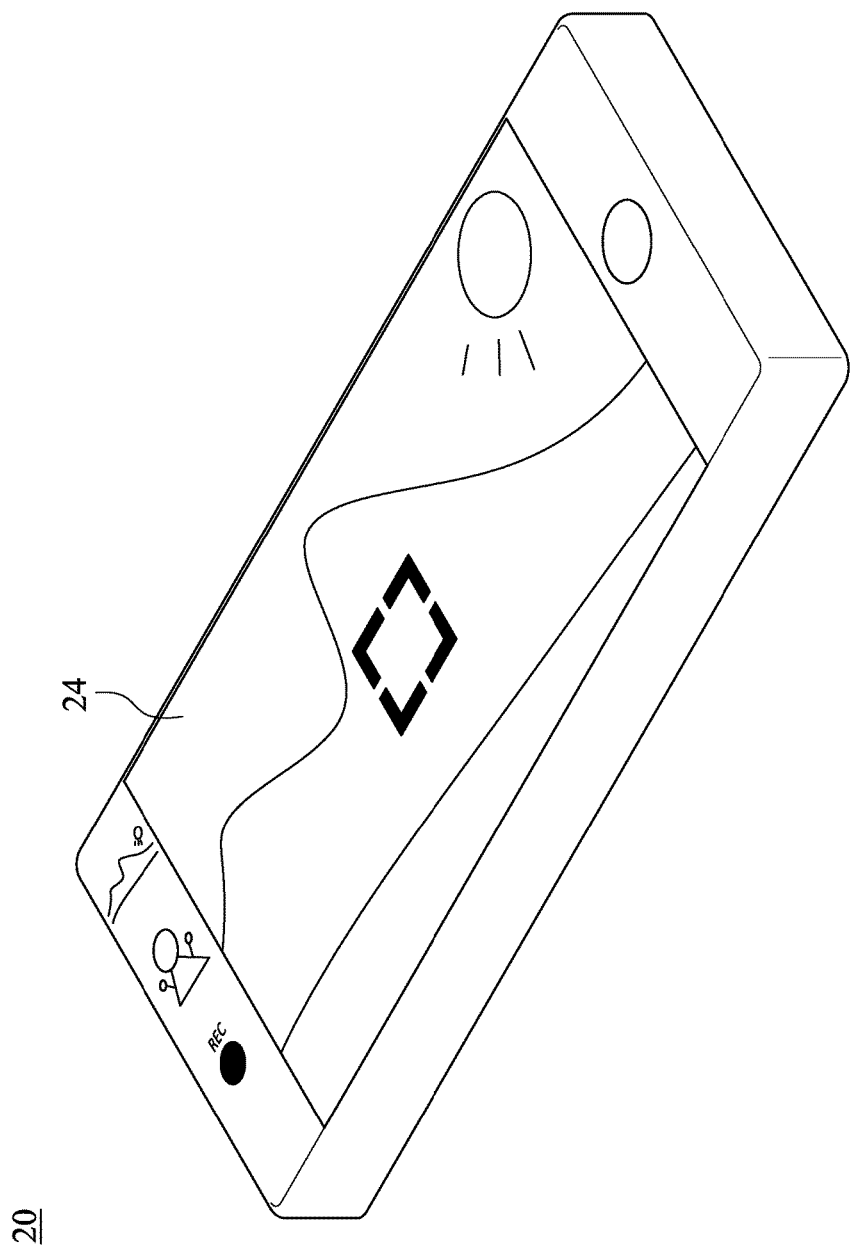
FIG. 21B is a schematic view of another side of the electronic device of FIG. 21A.
Figure 21C:
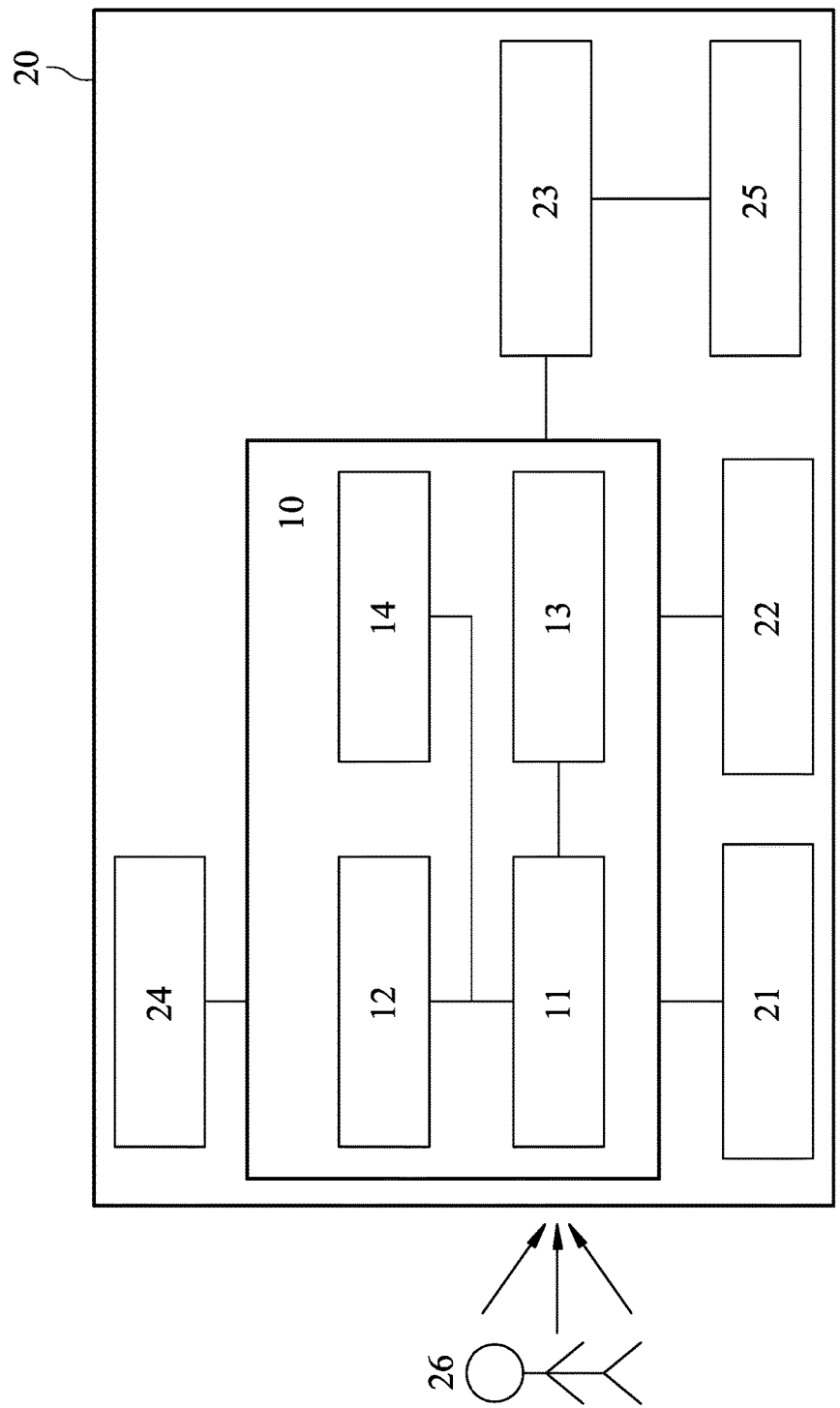
FIG. 21C is a system schematic view of the electronic device of FIG. 21A.

FIG. 21A is a schematic view of one side of an electronic device 20 according to the 11th embodiment of the present disclosure. FIG. 21B is a schematic view of another side of the electronic device 20 of FIG. 21A. FIG. 21C is a system schematic view of the electronic device 20 of FIG. 21A. In FIGS. 21A, 21B and 21C, the electronic device 20 according to the 11th embodiment is a smartphone, wherein the electronic device 20 includes the imaging apparatus 10, a flash module 21, a focusing assisting module 22, an image signal processor 23, a user interface 24 and an image software processor 25. When the user captures images of an imaged object 26 via the user interface 24, the electronic device 20 focuses and generates an image via the imaging apparatus 10 while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The imaging apparatus 10 according to the 11th embodiment is the same as the imaging apparatus 10 according to the 10th embodiment, and will not describe again herein.

12th Embodiment

FIG. 22 is a schematic view of an electronic device 30 according to the 12th embodiment of the present disclosure. The electronic device 30 of the 12th embodiment is a tablet personal computer, wherein the electronic device 30 includes an imaging apparatus 31, wherein the imaging apparatus 31 is the same as stated in the 10th embodiment, and will not describe again herein.

13th Embodiment

Figure 23:
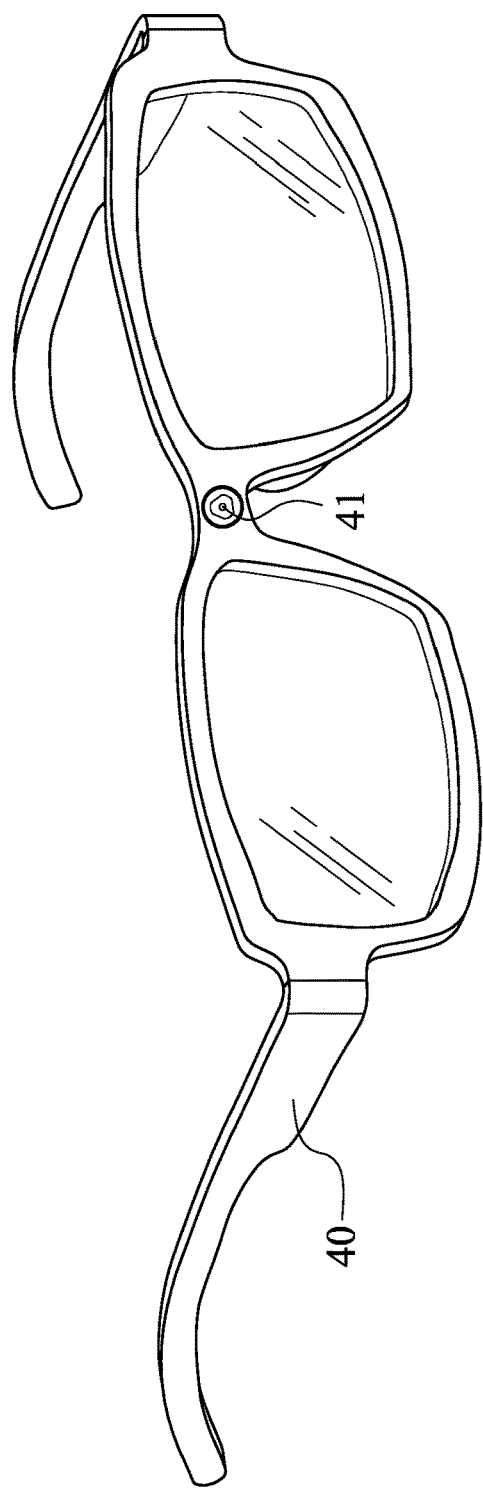
FIG. 23 is a schematic view of an electronic device according to the 13th embodiment of the present disclosure.

FIG. 23 is a schematic view of an electronic device 40 according to the 13th embodiment of the present disclosure. The electronic device 40 of the 13th embodiment is a wearable device, wherein the electronic device 40 includes an imaging apparatus 41, wherein the imaging apparatus 41 is the same as stated in the 10th embodiment, and will not describe again herein.

The foregoing description, for purpose of explanation, has been described with reference to specific embodiments. It is to be noted that Tables 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising five lens elements, the five lens elements being, in order from an object side to an image side:
   a first lens element with negative refractive power having an image-side surface being concave in a paraxial region thereof;
   a second lens element with positive refractive power having an image-side surface being convex in a paraxial region thereof;
   a third lens element having negative refractive power;
   a fourth lens element having positive refractive power; and
   a fifth lens element with negative refractive power having an image-side surface being concave in a paraxial region thereof and comprising at least one convex critical point in an off-axis region thereof, wherein both of an object-side surface and the image-side surface of the fifth lens element are aspheric;
   wherein, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the fifth lens element is R9, a curvature radius of the image-side surface of the fifth lens element is R10, an Abbe number of the third lens element is V3, an Abbe number of the fifth lens element is V5, and the following conditions are satisfied:

$1.0<T45/(T23+T34)<6.0$;

$0<T12/T45<1.80$;

$0<(R9+R10)/(R9-R10)$; and $|V3|+|V5|<65$.

2. The image capturing lens assembly of claim 1, wherein the third lens element has an image-side surface being concave in a paraxial region thereof.

3. The image capturing lens assembly of claim 1, wherein the object-side surface of the fifth lens element is convex in a paraxial region thereof.

4. The image capturing lens assembly of claim 1, wherein the axial distance between the first lens element and the second lens element is T12, the axial distance between the fourth lens element and the fifth lens element is T45, and the following condition is satisfied:

$0.3<T12/T45<1.5$.

5. The image capturing lens assembly of claim 1, wherein the axial distance between the second lens element and the third lens element is T23, the axial distance between the third lens element and the fourth lens element is T34, the axial distance between the fourth lens element and the fifth lens element is T45, and the following condition is satisfied:

$1.25<T45/(T23+T34)<5.0$.

6. The image capturing lens assembly of claim 1, wherein an axial distance between the image-side surface of the fifth lens element and an image surface is BL, the axial distance between the fourth lens element and the fifth lens element is T45, and the following condition is satisfied:

$0.75<BL/T45<1.80$.

7. The image capturing lens assembly of claim 1, wherein at least one of an object-side surface and an image-side surface of the third lens element comprises at least one critical point in an off-axis region thereof.

8. The image capturing lens assembly of claim 1, wherein the first lens element has an object-side surface being convex in a paraxial region thereof.

9. The image capturing lens assembly of claim 1, wherein a focal length of the image capturing lens assembly is f, a focal length of the fourth lens element is f4, a focal length of the fifth lens element is f5, and the following condition is satisfied:

$1.35<|f/f4|+|f/f5|<3.0$.

10. The image capturing lens assembly of claim 1, wherein a half of a maximum field of view of the image capturing lens assembly is HFOV, and the following condition is satisfied:

$1.0<\tan(HFOV)$.

11. The image capturing lens assembly of claim 1, wherein the first lens element has an object-side surface being concave in a paraxial region thereof and comprising at least one convex critical point in an off-axis region thereof, and both of the object-side surface and the image-side surface of the first lens element are aspheric.

12. The image capturing lens assembly of claim 1, wherein the fourth lens element has an object-side surface being convex in a paraxial region thereof.

13. The image capturing lens assembly of claim 1, wherein the fourth lens element has an object-side surface being concave in a paraxial region thereof and an image-side surface being convex in a paraxial region thereof, the object-side surface of the fifth lens element is convex in a paraxial region thereof, an f-number of the image capturing lens assembly is Fno, and the following condition is satisfied:

$1.20<Fno<2.30$.

14. An imaging apparatus, comprising:
the image capturing lens assembly of claim 1; and
an image sensor, wherein the image sensor is disposed on an image surface of the image capturing lens assembly.

15. An electronic device, comprising:
the imaging apparatus of claim 14.

16. An image capturing lens assembly comprising five lens elements, the five lens elements being, in order from an object side to an image side:
- a first lens element with negative refractive power having an image-side surface being concave in a paraxial region thereof;
- a second lens element having positive refractive power;
- a third lens element having negative refractive power;
- a fourth lens element having positive refractive power; and
- a fifth lens element with negative refractive power having an image-side surface being concave in a paraxial region thereof and comprising at least one convex critical point in an off-axis region thereof, wherein both of an object-side surface and the image-side surface of the fifth lens element are aspheric;

wherein, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the fifth lens element is R9, a curvature radius of the image-side surface of the fifth lens element is R10, and the following conditions are satisfied:

$1.66 < T45/(T23+T34) < 5.0;$ $-0.60 < (R9+R10)/(R9-R10);$ and $0.3 < T12/T45 < 1.5.$ 17. The image capturing lens assembly of claim 16, wherein a focal length of the image capturing lens assembly is f, a focal length of the fourth lens element is f4, a focal length of the fifth lens element is f5, and the following condition is satisfied:

$1.35 < |f/f4| + |f/f5|.$

18. The image capturing lens assembly of claim 16, wherein an Abbe number of the third lens element is V3, an Abbe number of the fifth lens element is V5, and the following condition is satisfied:

$|V3| + |V5| < 65.$

19. The image capturing lens assembly of claim 16, wherein a half of a maximum field of view of the image capturing lens assembly is HFOV, and the following condition is satisfied:

$1.0 < \tan(HFOV).$

20. The image capturing lens assembly of claim 16, wherein at least one of an object-side surface and an image-side surface of the third lens element comprises at least one critical point in an off-axis region thereof.

21. The image capturing lens assembly of claim 16, wherein an axial distance between the image-side surface of the fifth lens element and an image surface is BL, the axial distance between the fourth lens element and the fifth lens element is T45, and the following condition is satisfied:

$0.75 < BL/T45 < 1.80.$

* * * * *